United States Patent
Tago et al.

(10) Patent No.: US 10,586,994 B2
(45) Date of Patent: Mar. 10, 2020

(54) ELECTROLYTE SOLUTION AND METHOD FOR PRODUCING SAME, CONTINUOUSLY DISSOLVING FACILITY, ELECTROLYTE MEMBRANE, ELECTRODE CATALYST LAYER, MEMBRANE ELECTRODE ASSEMBLY AND FUEL CELL

(71) Applicants: ASAHI KASEI KABUSHIKI KAISHA, Tokyo (JP); DAIKIN INDUSTRIES, LTD., Osaka-shi, Osaka (JP)

(72) Inventors: Takahiro Tago, Tokyo (JP); Tetsuya Murakami, Tokyo (JP); Kazuhiro Ohtsuka, Osaka (JP)

(73) Assignees: ASAHI KASEI KABUSHIKI KAISHA, Tokyo (JP); DAIKIN INDUSTRIES, LTD., Osaka (JP)

( * ) Notice: Subject to any disclaimer, the term of this patent is extended or adjusted under 35 U.S.C. 154(b) by 378 days.

(21) Appl. No.: 14/901,522

(22) PCT Filed: Jun. 26, 2014

(86) PCT No.: PCT/JP2014/067084
§ 371 (c)(1),
(2) Date: Dec. 28, 2015

(87) PCT Pub. No.: WO2015/002073
PCT Pub. Date: Jan. 8, 2015

(65) Prior Publication Data
US 2016/0141696 A1    May 19, 2016

(30) Foreign Application Priority Data

Jul. 2, 2013  (JP) ................................. 2013-139139
Mar. 20, 2014  (JP) ................................. 2014-058612

(51) Int. Cl.
*H01M 8/00* (2016.01)
*H01M 8/1039* (2016.01)
(Continued)

(52) U.S. Cl.
CPC ............. *H01M 8/1039* (2013.01); *C08F 8/12* (2013.01); *C08F 8/26* (2013.01); *C08F 8/44* (2013.01);
(Continued)

(58) Field of Classification Search
CPC ............. H01M 8/1039; H01M 8/1023; H01M 4/9008; H01M 8/1004; H01M 8/1081;
(Continued)

(56) References Cited

U.S. PATENT DOCUMENTS 3,085,083 A   4/1963   Courtenay
5,863,587 A   1/1999   Badertscher et al.
(Continued)

FOREIGN PATENT DOCUMENTS

CN   1159304 A   9/1997
CN   1542029 A   11/2004
(Continued)

OTHER PUBLICATIONS

Supplementary European Search Report issued with respect to application No. EP16186928.4, dated Dec. 6, 2016.
(Continued)

*Primary Examiner* — Nicholas P D'Aniello
(74) *Attorney, Agent, or Firm* — Greenblum & Bernstein, P.L.C.

(57) ABSTRACT

A method for producing an electrolyte solution including a supply step of continuously supplying an emulsion based a polymer electrolyte and a solvent into a dissolution facility, and a dissolution step of continuously dissolving the poly-
(Continued)

mer electrolyte in the solvent by heating the interior of the dissolution facility to obtain the electrolyte solution.

7 Claims, 2 Drawing Sheets

(51) Int. Cl.

| | |
|---|---|
| C08F 216/14 | (2006.01) |
| C08J 5/22 | (2006.01) |
| H01M 8/1081 | (2016.01) |
| H01M 8/1023 | (2016.01) |
| C08F 8/44 | (2006.01) |
| C08F 8/26 | (2006.01) |
| C08J 3/03 | (2006.01) |
| C08F 214/26 | (2006.01) |
| C08F 8/12 | (2006.01) |
| H01M 4/90 | (2006.01) |
| H01M 8/1004 | (2016.01) |
| H01M 8/1018 | (2016.01) |

(52) U.S. Cl.
CPC ........ *C08F 214/262* (2013.01); *C08F 216/14* (2013.01); *C08J 3/03* (2013.01); *C08J 5/2237* (2013.01); *H01M 4/9008* (2013.01); *H01M 8/1004* (2013.01); *H01M 8/1023* (2013.01); *H01M 8/1081* (2013.01); *C08J 2327/16* (2013.01); *H01M 2008/1095* (2013.01); *H01M 2300/0082* (2013.01); *Y02P 70/56* (2015.11)

(58) Field of Classification Search
CPC ... H01M 2008/1095; H01M 2300/0082; C08J 5/2237; C08F 216/14; Y02P 70/56
See application file for complete search history.

(56) References Cited

U.S. PATENT DOCUMENTS

| | | | |
|---|---|---|---|
| 2002/0070179 A1 | 6/2002 | Pilz et al. | |
| 2004/0054093 A1 | 3/2004 | Inagaki et al. | |
| 2004/0067401 A1* | 4/2004 | Hasegawa ............. | C08J 5/2237 521/27 |
| 2005/0249034 A1 | 11/2005 | Takagi et al. | |
| 2007/0142580 A1 | 6/2007 | Ino et al. | |
| 2008/0227875 A1 | 9/2008 | Curtin et al. | |
| 2011/0020728 A1 | 1/2011 | Kita et al. | |
| 2012/0178017 A1 | 7/2012 | Murai et al. | |
| 2013/0210943 A1 | 8/2013 | Murai et al. | |
| 2016/0141696 A1 | 5/2016 | Tago et al. | |

FOREIGN PATENT DOCUMENTS

| | | |
|---|---|---|
| CN | 1845363 A | 10/2006 |
| CN | 101597027 A | 12/2009 |
| EP | 1083189 A1 | 3/2001 |
| EP | 1702933 A1 | 9/2006 |
| JP | 2001-504872 A | 4/2001 |
| JP | 2002-210349 A | 7/2002 |
| JP | 2005-082748 A | 3/2005 |
| JP | 2005-235521 A | 9/2005 |
| JP | 2005-319409 A | 11/2005 |
| JP | 2006-078226 A | 3/2006 |
| JP | 2007-038639 A | 2/2007 |
| JP | 2007-146173 A | 6/2007 |
| JP | 2009-231163 A | 10/2009 |
| JP | 2010-225585 A | 10/2010 |
| JP | 2011-034738 A | 2/2011 |
| JP | 4916668 B2 | 4/2012 |
| JP | 2013-051051 A | 3/2013 |
| WO | 2005-058980 A1 | 6/2005 |
| WO | 2009/116446 A1 | 9/2009 |
| WO | 2009-125695 A1 | 10/2009 |
| WO | 2011-034179 A1 | 3/2011 |

OTHER PUBLICATIONS

Supplementary European Search Report issued with respect to application No. EP16186932.6, dated Dec. 6, 2016.
Gubler et al., "Radicals in Fuel Cell Membranes: Mechanisms of Formation and Ionomer Attack", ECS Transactions, 41 (1), pp. 1431-1439, 2011.
Mars G. Fontana et al., "Advances in Corrosion Science and Technology", vol. 1, Chapter 1, Techniques for the Measurement of Electrode Processes at Temperatures Above 1000 C, Experimental Techniques, Pressure Vessels and Liners, p. 6-7, 1970.
Yuan et al., "A Study of the Effect of Heat-Treatment on the Morphology of Nation Ionomer Dispersion for Use in the Passive Direct Methanol Fuel Cell (DMFC)," Membranes, 2012, vol. 2, pp. 841-854.
European Search Report issued with respect to application No. 14820166.8, dated May 31, 2016.
International Search Report issued with respect to application No. PCT/JP2014/067084, dated Sep. 16, 2014.
International Preliminary Report on Patentability issued with respect to application No. PCT/JP2014/067084, dated Jan. 5, 2016.
Tang et al., "Highly Durable Proton Exchange Membranes for Low Temperature Fuel Cells", Journal of Physical Chemistry B, vol. 111, No. 30, 2007, pp. 8684-8690.

* cited by examiner

ELECTROLYTE SOLUTION AND METHOD FOR PRODUCING SAME, CONTINUOUSLY DISSOLVING FACILITY, ELECTROLYTE MEMBRANE, ELECTRODE CATALYST LAYER, MEMBRANE ELECTRODE ASSEMBLY AND FUEL CELL

TECHNICAL FIELD

The present invention relates to an electrolyte solution and a method for producing the electrolyte solution, a continuously dissolving facility, an electrolyte membrane, an electrode catalyst layer, a membrane electrode assembly and a fuel cell.

BACKGROUND ART

Recently, there has been a growing demand for solid polymer electrolyte fuel cells. In producing e.g., membranes and electrodes for solid polymer electrolyte fuel cells, a solution of fluorine-based polymer electrolytes (hereinafter referred to also as "fluorine-based polymer electrolyte") having a sulfonate functional group (hereinafter referred to also as "H-type") is used.

It is required that these electrolyte membranes and electrodes have hot water dissolution resistance in order to improve output characteristics of fuel cells. It is also required that a solution having an electrolyte highly dispersed therein is produced in a short time. In addition, as a material for an electrolyte membrane and an electrode a highly concentrated electrolyte solution is preferable in view of handling.

In conventional methods for producing a fluorine-based polymer electrolyte solution, a fluorine-based polymer electrolyte is generally dissolved in a water/alcohol mixed solvent while stirring in a batch-type closed reactor, such as an autoclave electrolyte under high temperature and pressure.

For example, Patent Literature 1 discloses a method of dissolving a bulk of a perfluorosulfonated polymer electrolyte in a water/ethanol mixed solvent at 165° C. for 7 hours to solid content of approximately 5 mass % solution, in an autoclave made of SUS304 having a glass inner cylinder.

Patent Literature 2 discloses a method of supplying a micron-order fine-particles dispersion without clogging by controlling the angle of a flow channel.

Patent Literature 3 discloses a method of treating an electrolyte-containing solution with heat at a temperature of the glass transition temperature of the electrolyte to 300° C.

Patent Literature 4 discloses a method of suspending organic and inorganic components in water, bringing the water into a near-critical or supercritical state and passing the aqueous solution of this state through a tubular reactor.

Typical examples of the H-type fluorine-based polymer electrolyte solution include Nafion <registered trade mark> Dispersion Solution (manufactured by DuPont in the United States) and Aciplex <registered trade mark> —SS (manufactured by Asahi Kasei E-materials Corporation). However, since the solubility of the H-type fluorine-based polymer electrolyte to a solvent is extremely low, various techniques have been so far proposed for use in a method for producing an electrolyte solution.

For example, Patent Literature 5 discloses methods of dissolving bulks of H-type and sodium-type (hereinafter referred to also as "Na-type") fluorine-based polymer electrolytes in a solvent containing water or a water-immiscible organic solvent at a high temperature of 200° C. or more.

Patent Literature 6 discloses a method of dissolving a bulk of a Na-type fluorine-based polymer electrolyte in water at a high temperature of 200° C. or more. Patent Literature 7 describes a method of dissolving an emulsion of a fluorine-based polymer electrolyte by heating while stirring in an autoclave at a temperature of 50 to 250° C. for 1 to 12 hours.

CITATION LIST

Patent Literature

Patent Literature 1: Japanese Patent Laid-Open No. 2005-82748
Patent Literature 2: Japanese Patent Laid-Open No. 2005-319409
Patent Literature 3: Japanese Patent Laid-Open No. 2013-51051
Patent Literature 4: Japanese Patent Laid-Open No. 2002-210349
Patent Literature 5: National Publication of International Patent Application No. 2001-504872
Patent Literature 6: WO2009-125695A1
Patent Literature 7: WO2011-034179A1

SUMMARY OF INVENTION

Technical Problem

In Patent Literature 1, however, in dissolving a bulk of a perfluorosulfonated polymer electrolyte using an autoclave (batch system), it takes a long time of 7 hours to dissolve a solid-content (approximately 5 mass %) low in concentration. It cannot be said that such dissolution is effective, and productivity thereof is significantly low.

Patent Literature 2 discloses a method of supplying a fine-particle dispersion solution and does not disclose continuous dissolution of a polymer electrolyte of a fine-particle dispersion solution, i.e., an emulsion.

Patent Literature 3 discloses a method for dispersing an electrolyte solution and does not disclose a continuous dissolution of a polymer electrolyte of an emulsion. Patent Literature 4 does not disclose a method of dissolving an electrolyte-based emulsion.

In Patent Literatures 5 and 6, the electrolyte solution obtained by dissolving a bulk of Na-type fluorine-based polymer electrolyte is extremely viscous and aggregated solution or contains a polymer electrolyte remaining undissolved. In other words, the fluorine-based polymer electrolyte is insufficiently dispersed in a dissolution step. Also, in Patent Literature 5, the dissolution temperature of an H-type fluorine-based polymer electrolyte bulk is near the thermal decomposition initiation temperature of the electrolyte, which suggests that thermal decomposition of the electrolyte occurs during a dissolution step. In other words, it is suggested that the concentration of a fluorine ion in the electrolyte solution is high, and that the hot water dissolution resistance of the electrolyte membrane and electrode catalyst layer obtained from the electrolyte solution is low. What is specifically disclosed in Patent Literature 7 is a method of forming a membrane by directly casting an emulsion of an H-type fluorine-based polymer electrolyte, or a method for forming an electrode binder by directly mixing an emulsion of an H-type fluorine-based polymer electrolyte with a catalyst. If the emulsion is dissolved at a high temperature, thermal decomposition of the electrolyte takes place, with the result that the concentration of a fluorine ion in the electrolyte solution increases and the hot water dissolution resistance of the electrolyte membrane or the electrode catalyst layer obtained from the electrolyte solution becomes presumably low.

The present invention was attained in view of the aforementioned problems. An object of the present invention is to provide an electrolyte solution production method which enables to produce an electrolyte solution having a polymer electrolyte highly dispersed herein, efficiently with good productivity (continuously), i.e., in a short time and in a large amount, and provide a continuously dissolving facility.

Another object of the present invention is to provide an electrolyte solution having a polymer electrolyte highly dispersed therein and providing an electrolyte membrane and an electrode catalyst layer having high hot water dissolution resistance.

Another object of the present invention is to provide an electrolyte membrane, an electrode catalyst layer, a membrane electrode assembly and a fuel cell with satisfactory output characteristics by using the aforementioned electrolyte solution.

Solution to Problem

The present inventors have intensively conducted studies with a view to attaining aforementioned objects. As a result, they have found that the objects can be attained by production methods having predetermined constitutions, and achieved the present invention.

The present invention is more specifically as follows.

[1]
A method for producing an electrolyte solution, comprising:
a supply step of continuously supplying an emulsion comprising a polymer electrolyte and a solvent into a dissolution facility; and
a dissolution step of continuously dissolving the polymer electrolyte in the solvent by heating an interior of the dissolution facility to obtain the electrolyte solution.

[2]
The method for producing the electrolyte solution according to Item [1], wherein, in the dissolution step, a heating temperature of the interior of the dissolution facility is 150 to 350° C.

[3]
The method for producing the electrolyte solution according to Item [1] or [2], wherein, in the dissolution step, the heating temperature of the interior of the dissolution facility is 150 to 290° C.

[4]
The method for producing the electrolyte solution according to any one of Items [1] to [3], wherein, in the dissolution step, a pressure within the dissolution facility exceeds vapor pressure of the solvent at the heating temperature of the dissolution facility.

[5]
The method for producing the electrolyte solution according to any one of Items [1] to [4], wherein, in the dissolution step, the pressure within the dissolution facility is controlled by use of a back pressure regulating valve so as to exceed the vapor pressure of the solvent at the heating temperature of the dissolution facility.

[6]
The method for producing the electrolyte solution according to any one of Items [1] to [5], further comprising, after the dissolution step, a cooling step of cooling the electrolyte solution while maintaining a pressure exceeding the vapor pressure of the solvent at the heating temperature of the interior of the dissolution facility.

[7]
The method for producing the electrolyte solution according to any one of Items [1] to [6], wherein the dissolution facility is a tube.

[8]
The method for producing the electrolyte solution according to any one of Items [1] to [7], wherein the polymer electrolyte contains a fluorine-based polymer electrolyte.

[9]
The method for producing the electrolyte solution according to Item [8], wherein
the fluorine-based polymer electrolyte has an average particle diameter of 10 nm or more and less than 500 nm, and
the fluorine-based polymer electrolyte contains a $-SO_3X$ group where X is an alkali metal, an alkaline-earth metal or $NR_1R_2R_3R_4$ where $R_1$, $R_2$, $R_3$ and $R_4$ are each independently an alkyl group having 1 to 3 carbon atoms or hydrogen.

[10]
A continuously dissolving facility comprising:
a pump for continuously supplying an emulsion comprising a polymer electrolyte and a solvent into a dissolution facility;
the dissolution facility for continuously dissolving the polymer electrolyte in the solvent; and
heating means which heats the dissolution facility.

[11]
The continuously dissolving facility according to Item [10], wherein the dissolution facility is a tube.

[12]
An electrolyte solution obtained by the method for producing the electrolyte solution according to any one of Items [1] to [9] or produced by the continuously dissolving facility according to Item [10] or [11].

[13]
An electrolyte solution comprising: a fluorine-based polymer electrolyte which contains a $-SO_3X$ group where X is hydrogen, an alkali metal, an alkaline-earth metal or $NR_1R_2R_3R_4$ where $R_1$, $R_2$, $R_3$ and $R_4$ are each independently an alkyl group having 1 to 3 carbon atoms or hydrogen; and a water-containing solvent, wherein
in a dynamic light scattering particle-size measurement, at least one particle-size peak top (A) is present in a range of 0.10 μm or more and less than 5.0 μm and at least one particle-size peak top (B) is present in a range of 5.0 μm or more and 50.0 μm or less,
a scattering intensity ratio (A/B) of the particle-size peak top (A) to the particle-size peak top (B) is $1.0×10^{-2}$ or more and 1.0×10 or less, and
a fluorine ion concentration is 500 ppm or less based on a solid-content mass of the fluorine-based polymer electrolyte.

[14]
The electrolyte solution according to Item [13], wherein no scattering peak is present in the laser diffraction/scattering particle size distribution measurement.

[15]
The electrolyte solution according to Item [13] or [14], wherein the fluorine-based polymer electrolyte contains a copolymer having a repeating unit represented by the following formula (1) and a repeating unit represented by the following formula (2):

$$-(CFZ-CF_2)- \quad (1)$$

where Z represents H, Cl, F or a perfluoroalkyl group having 1 to 3 carbon atoms,

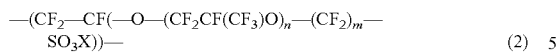
(2)

where X is hydrogen, an alkali metal, an alkaline-earth metal or $NR_1R_2R_3R_4$ where $R_1$, $R_2$, $R_3$ and $R_4$ are each independently an alkyl group having 1 to 3 carbon atoms or hydrogen; m is an integer of 0 to 12; and n is an integer of 0 to 2, with the proviso that m and n are not simultaneously 0.

[16]

The electrolyte solution according to Item [15], wherein
the Z is F,
X is K, Na or Li,
n is 0 and
m is 2.

[17]

The electrolyte solution according to Item [15] or [16], wherein
the Z is F,
X is Na,
n is 0 and
m is 2.

[18]

The electrolyte solution according to any one of Items [13] to [17], wherein the fluorine-based polymer electrolyte has an equivalent mass of 300 to 1,000 g/eq.

[19]

The electrolyte solution according to any one of Items [13] to [18], wherein the fluorine-based polymer electrolyte has a solid-content of 11 to 50 mass %.

[20]

The electrolyte solution according to any one of Items [13] to [19], wherein the water-containing solvent contains 80 to 100 mass % of water and 0 to 20 mass % of an alcohol.

[21] An electrolyte solution comprising a fluorine-based polymer electrolyte, wherein
40 mass % or more of polymer chain terminals of the fluorine-based polymer electrolyte is —$CF_2H$,
a fluorine ion concentration (mass %) is 0.10 to 500 ppm based on a solid-content mass of the fluorine-based polymer electrolyte, and
an Fe concentration is 0.01 to 10 ppm based on a solid-content mass of the fluorine-based polymer electrolyte.

[22]

An electrolyte membrane comprising a fluorine-based polymer electrolyte, wherein
40 mass % or more of polymer chain terminals of the fluorine-based polymer electrolyte is —$CF_2H$,
a fluorine ion concentration (mass %) is 0.10 to 500 ppm based on a solid-content mass of the fluorine-based polymer electrolyte, and
an Fe concentration (mass %) is 0.01 to 10 ppm based on a solid-content mass of the fluorine-based polymer electrolyte.

[23]

An electrolyte membrane formed of the electrolyte solution according to any one of Items [12] to [21].

[24]

An electrode catalyst layer formed of the electrolyte solution according to any one of Items [12] to [21].

[25]

A membrane electrode assembly having the electrolyte membrane according to Item [22] or [23] and the electrode catalyst layer according to Item [24].

[26]

A fuel cell having the membrane electrode assembly according to Item [25].

Advantageous Effects of Invention

According to the present invention, it is possible to provide an electrolyte solution production method which enables to produce an electrolyte solution having a polymer electrolyte highly dispersed therein, efficiently with good productivity, i.e., in a short time and in a large amount, and provide a continuously dissolving facility.

According to the present invention, it is possible to further provide an electrolyte solution having a polymer electrolyte highly dispersed therein and providing an electrolyte membrane and an electrode catalyst layer having high hot water dissolution resistance.

According to the present invention, it is possible to further provide an electrolyte membrane, an electrode catalyst layer, a membrane electrode assembly and a fuel cell with satisfactory output characteristics by using the aforementioned electrolyte solution.

DESCRIPTION OF EMBODIMENTS

Figure 1:
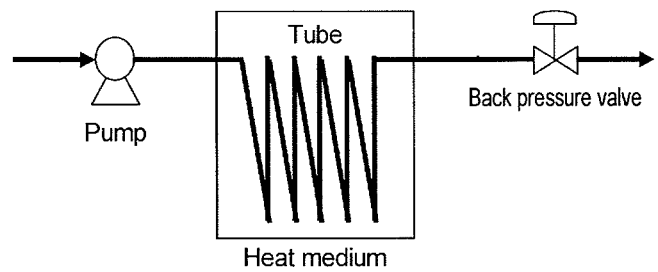
FIG. 1 shows a schematic view showing a continuously dissolving facility according to an embodiment of the invention.

Now, the embodiment for carrying out the invention (hereinafter referred to as the "the present embodiment") will be more specifically described below; however, the present invention is not limited to the present embodiment and can be modified in various ways without departing from the spirit of the invention.

[Method for Producing an Electrolyte Solution]

The method for producing an electrolyte solution according to the present embodiment includes a supply step of continuously supplying an emulsion comprising a polymer electrolyte and a solvent into a dissolution facility and a dissolution step of continuously dissolving the polymer electrolyte in the solvent by heating the interior of the dissolution facility to obtain an electrolyte solution.

If the method for producing an electrolyte solution as mentioned above is employed, dispersibility of a fluorine-based polymer electrolyte in an electrolyte solution is more improved, and an electrolyte solution improved in dispersibility can be obtained in a shorter time even if a highly concentrated polymer electrolyte (high solid-content concentration) is used. Particularly, if the above steps are continuously carried out, an electrolyte solution can be more efficiently produced in a short period of time in a large amount. Now, each of the steps will be more specifically described below.

[Supply Step]

The supply step is a step of continuously supplying an emulsion comprising a polymer electrolyte and a solvent into a dissolution facility. Examples of the supplying method, although it is not particularly limited as long as it can feed an emulsion, include a feeding method by a pump.

Note that, in the specification of the present application, "continuously" means that an operation is not carried out in a batch system. The case where the time zone for supplying raw materials and the time zone for discharging e.g., a product and a reaction solution are at least partly overlapped; the case where raw materials and the like are continuously supplied and e.g., a product and a reaction solution are continuously discharged; and the case where materials to be treated are continuously transferred even intermittently, are included.

[Emulsion]

The emulsion is a solution prepared by dispersing particles of a polymer electrolyte in a solvent. Such an emulsion can be produced by a method described, for example, in WO2011-034179A1; however the method is not particularly limited to this. It is preferable that operations such as coagulation and drying of emulsion particles are not included during a process for producing an emulsion. If particles are maintained without any coagulation, the emulsion in which particles having an average particle diameter of 10 or more and less than 500 nm are dispersed can be easily obtained.

As an emulsion, an emulsion in which particles of a polymer electrolyte is dispersed in a solvent with the help of an emulsifier is acceptable. An emulsion may be formed of a single type of polymer electrolyte or two or more types of polymer electrolytes in combination. Other additives may be added to an emulsion.

[Polymer Electrolyte]

The polymer electrolyte is not limited as long as it can form an emulsion, and examples thereof include a polymer electrolyte comprising an —$SO_3X$ group, a —COOX group or a —$PO_3X_2$ group (X is hydrogen, an alkali metal, an alkaline-earth metal or $NR_1R_2R_3R_4$; $R_1$, $R_9$, $R_3$ and $R_4$ are each independently an alkyl group having 1 to 3 carbon atoms or hydrogen); a polymer electrolyte that can form an emulsion with the help of an emulsifier; a polymer electrolyte not comprising an —$SO_3X$ group, a —COOX group or a —$PO_3X_2$ group and capable of forming an emulsion or slurry without the help of an emulsifier, or other polymer electrolyte capable of being dispersed in solvents. Among them, a polymer electrolyte comprising an —$SO_3X$ group, a —COOX group or a —$PO_3X_2$ group is preferable. If such a polymer electrolyte is used, dispersibility of the polymer electrolyte after dissolution tends to be more improved.

Note that the term "electrolytes" used in the present invention generally indistinguishably includes a precursor (ended with e.g., —$SO_2F$) thereof.

(Fluorine-Based Polymer Electrolyte)

The polymer electrolyte is preferably a fluorine-based polymer electrolyte, more preferably a fluorine-based polymer electrolyte having an —$SO_3X$ group, a —COOX group or a —$PO_3X_2$ group and further preferably a fluorine-based polymer electrolyte having an —$SO_3X$ group. If such a polymer electrolyte is used, the solubility of the polymer electrolyte in a solvent tends to be further improved.

The fluorine-based polymer electrolyte is not particularly limited. For example, a fluorine-based polymer electrolyte containing a copolymer having a repeating unit represented by the following formula (1) and a repeating unit represented by the following formula (2) is preferable.

—(CFZ—$CF_2$)—     (1)

(in the above formula (1), Z represents H, Cl, F or a perfluoroalkyl group having 1 to 3 carbon atoms)

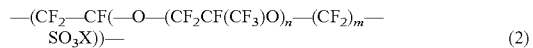

—($CF_2$—CF(—O—($CF_2$CF($CF_3$)O)$_n$—($CF_2$)$_m$—
   $SO_3X$))—     (2)

(in the above formula (2), X is hydrogen, an alkali metal, an alkaline-earth metal, or $NR_1R_2R_3R_4$ where $R_1$, $R_2$, $R_3$ and $R_4$ are each independently an alkyl group having 1 to 3 carbon atoms or hydrogen, m is an integer of 0 to 12 and n is an integer of 0 to 2; with the proviso that m and n are not simultaneously 0).

Among them, a fluorine-based polymer electrolyte in which Z is F; X is K, Na, or Li; n is 0; and m is 2, is preferable. Furthermore, a fluorine-based polymer electrolyte in which Z is F; X is Na; n is 0; and m is 2, is more preferable. If such a fluorine-based polymer electrolyte is used, an electrolyte solution having a higher dispersibility can be obtained in a shorter time.

The fluorine-based polymer electrolyte may have other functional groups. Examples of the other functional groups include, but are not particularly limited to, an —$SO_2F$ group, a —$CF_2H$ group and a —$CF_3$ group.

The average particle diameter of a polymer electrolyte in an emulsion, which is determined by dynamic light scattering particle-size measurement, is preferably 10 nm or more and less than 500 nm, more preferably 50 nm or more and 300 nm or less and further preferably 100 nm or more and 200 nm or less. If the average particle diameter of a polymer electrolyte falls within the above range, the stability of the particles of the polymer electrolyte is improved and the particles of the polymer electrolyte can be easily produced. Note that the average particle diameter can be determined by the dynamic light scattering particle-size measurement described in Examples.

(Equivalent Mass)

The equivalent mass of a polymer electrolyte in an emulsion is preferably 300 to 1,000 g/eq, more preferably 400 to 900 g/eq and further preferably 500 to 800 g/eq. If the equivalent mass is 300 g/eq or more, e.g., an electrolyte membrane having further excellent power generation performance tends to be obtained. In contrast, if the equivalent mass is 1,000 g/eq or less, e.g., an electrolyte membrane having lower water-absorbing property and more excellent mechanical strength tends to be obtained. The "equivalent mass of a polymer electrolyte" herein refers to a dry mass per equivalent of a sulfonate group. Note that equivalent mass of a polymer electrolyte can be measured by the method described in Examples (described later).

(Solid-Content Concentration)

The solid-content concentration of a polymer electrolyte in an emulsion is preferably 11 to 50 mass %, more preferably 15 to 45 mass % and further preferably 20 to 40 mass %. If the solid-content of a polymer electrolyte is 11 mass % or more, the yield per unit time tends to become more excellent. In contrast, if the solid-content of a polymer electrolyte is 50 mass % or less, difficulty of handling due to generation of undissolved matter and an increase of viscosity tend to be more suppressed. The solid-content concentration can be measured by the method described in Examples.

(Melt Flow Rate)

The melt flow rate (MFR) of a polymer electrolyte in an emulsion is preferably 100 g/10 minutes or less, more preferably 10 g/10 minutes or less and further preferably 5 g/10 minutes or less. If MFR is 100 g/10 minutes or less, the output characteristics of a fuel cell tend to be maintained for a longer time. In contrast, MFR is preferably 0.01 g/10 minutes or more, more preferably 0.1 g/10 minutes or more and further preferably 0.3 g/10 minutes or more. If MFR is 0.01 g/10 minutes or more, a polymer electrolyte tends to successfully and more efficiently dissolved. Note that MFR can be measured by the method described in Examples.

(Spherical Shape)

The particles of a polymer electrolyte in an emulsion are preferably spherical. The "spherical" herein refers to a shape having an aspect ratio of 3.0 or less. Generally, as the aspect ratio of a shape comes closer to 1.0, the shape becomes closer to a sphere. The aspect ratio of the spherical particles is preferably 3.0 or less, more preferably 2.0 and further preferably 1.5. The lower limit of the aspect ratio of the spherical particles is preferably 1.0. If the aspect ratio falls within the above range, the viscosity of the electrolyte solution further decreases and handling tends to be improved even if the solid-content mass of a polymer electrolyte is increased. Note that the aspect ratio can be measured by the method described in Examples.

[Solvent]

Examples of the solvent include, but not particularly limited to, water and a water-organic solvent mixture. Examples of such an organic solvent include, but not particularly limited to, protic organic solvents such as an alcohol and glycerin; and aprotic solvents such as N,N-dimethylformamide, N,N-dimethylacetamide and N-methylpyrrolidone. These can be used alone or in combination of two or more.

Preferable examples of the alcohol include, but not particularly limited to, a low boiling-point alcohol having 1 to 3 carbon atoms. These alcohols may be used alone or in combination of two or more. Examples of the low boiling-point alcohol having 1 to 3 carbon atoms include, but not particularly limited to, at least one alcohol selected from the group consisting of methanol, ethanol, 1-propanol and 2-propanol. Among them, ethanol and 1-propanol are preferable. If such an alcohol is used, the dispersibility of a polymer electrolyte in an electrolyte solution tends to be more improved and the affinity of the polymer electrolyte tends to be more improved.

The content of water in a solvent is preferably 80 to 100 mass %, more preferably 90 to 100 mass % or more and further preferably 100 mass %. If the concentration of water is the above concentration, the dispersibility of a polymer electrolyte in an electrolyte solution tends to be more improved. Because of this, an electrolyte solution comprising a polymer electrolyte having a higher solid-content mass tends to be successfully obtained.

The content of an organic solvent in the solvent is preferably 0 to 50 mass %, more preferably 0 to 20 mass %, further preferably 0 to 10 mass % and still further preferably 0 mass %. If the concentration of an organic solvent is the above concentration, the dispersibility of a polymer electrolyte in an electrolyte solution tends to be more improved. Because of this, an electrolyte solution comprising a polymer electrolyte having a higher solid-content mass tends to be successfully obtained. Furthermore, using no flammable organic solvent is preferable in a safety point of view.

(Transmittance in UV Measurement)

As a reference for estimating degree of dissolution, a transmittance of a solution having a solid-content of 20 mass % at a wavelength of 800 nm in UV measurement can be used. The transmittance of an emulsion is preferably less than 90% T, more preferably less than 70% T and further preferably less than 50% T. If the transmittance is less than 90% T, the particles constituting an emulsion are small in size and tend to be more easily dissolved.

[Dissolution Step]

The dissolution step is a step of continuously dissolving a polymer electrolyte in a solvent by heating the interior of a dissolution facility to obtain an electrolyte solution. If such a dissolution step is employed, an electrolyte solution can be obtained in a shorter period of time.

Note that the "dissolution" refers to a treatment of dissolving or finely dispersing a polymer electrolyte of an emulsion in a solvent to obtain a polymer solution. Whether a polymer electrolyte is dissolved or not can be determined and confirmed based on scattering-intensity ratio in dynamic light scattering particle-size measurement (described later) or/and transmittance in UV measurement.

In the dissolution step, the heating temperature within the dissolution facility is preferably 50° C. or more, more preferably 100° C. or more, further preferably 150° C. or more, still further preferably 200° C. or more and further more preferably 250° C. or more. In contrast, in the dissolution step, the heating temperature within the dissolution facility is preferably 500° C. or less, more preferably 400° C. or less, further preferably 350° C. or less, still further preferably 300° C. or less and further more preferably 290° C. or less. If the heating temperature is 50° C. or more, the solubility and dispersibility of a polymer electrolyte in a solvent tend to further improve. In contrast, if the heating temperature is 500° C. or less, the thermal decomposition of a polymer electrolyte tends to be further suppressed. Note that, the heating temperature within the dissolution facility refers to, for example, the temperature of a thermostatic bath or the like or the value of temperature of the emulsion within the dissolution facility actually measured, or refers to both of the temperatures. With respect to the actual temperature of the emulsion or electrolyte solution within the dissolution facility, the temperature of at least a part of the flow channel of the dissolution facility is preferably equivalent to the heating temperature within the dissolution facility, in view of the dispersibility of the electrolyte solution.

In the dissolution step, the dissolution time (residence time of an emulsion in the dissolution facility) is not particularly limited, since more preferable range of the dissolution time varies depending upon the dissolution method. The dissolution time is preferably one minute or more, more preferably two minutes or more and further preferably three minutes or more. In contrast, the dissolution time is preferably 240 minutes or less, more preferably 120 minutes or less, further preferably 90 minutes or less and still further preferably 60 minutes or less. If the dissolution time falls within the above range, the dispersibility of a polymer electrolyte is more improved and the thermal decomposition of the polymer electrolyte tends to be more suppressed. Note that the residence time of an emulsion in a dissolution facility is represented by the value obtained by dividing the content volume in the heated dissolution facility by the feed rate of a pump.

The pressure within a dissolution facility preferably exceeds the vapor pressure of a solvent at the heating temperature of the dissolution facility, and is preferably not more than the preset pressure of a safety valve provided in the facility. If the pressure within the dissolution facility falls within the above range, the solubility of a polymer electrolyte in a solvent is further improved and a solution in which such a polymer electrolyte is dissolved in a higher level tends to be obtained in a shorter time. In addition, the solution can be fed without causing clogging in the dissolution facility. Note that the pressure within a dissolution facility is preferably controlled by use of a back pressure regulating valve so as to exceed the vapor pressure of the solvent at the heating temperature of the dissolution facility.

Note that in order to improve the dissolution efficiency, the dissolution facility is preferably a tube. In order to control pressure, the above dissolution step is preferably performed in a closed reactor. The details of the dissolution facility will be described later.

[Cooling step]

The method for producing an electrolyte solution of the present embodiment may further have, after the dissolution step, a cooling step of cooling the electrolyte solution while maintaining a pressure beyond the vapor pressure of a solvent at the heating temperature within the dissolution facility. If such a cooling step is employed, the electrolyte solution can be fed outside the dissolution facility without clogging of the dissolution facility. After the cooling step, the pressure is reduced. In this manner, the electrolyte solution can be obtained.

[Discharge Step]

The method for producing an electrolyte solution of the present embodiment may have a discharge step for discharging the electrolyte solution out of the dissolution facility. Examples of the discharge method include, but not particularly limited to, a method for discharging an electrolyte solution through a back pressure regulating valve (described later).

[Ion Exchange Step]

The method for producing an electrolyte solution of the present embodiment may further have, after the dissolution step, a cooling step or a discharge step, an ion exchange step of ion exchanging to H in the case where X is an alkali metal or an alkaline-earth metal. If an ion exchange step is employed, power generation performance of a fuel cell prepared by using an electrolyte membrane or the electrode catalyst layer using the electrolyte solution tends to be improved. Note that examples of a method for exchanging ions, include, but not particularly limited to, a method of passing an electrolyte solution through a cationic exchange resin.

[Continuously Dissolving Facility]

The continuously dissolving facility of the present embodiment has a pump for continuously supplying an emulsion comprising a polymer electrolyte and a solvent into a dissolution facility; a dissolution facility for continuously dissolving the polymer electrolyte in the solvent; and a heating mean which heats the dissolution facility. FIG. 1 shows a schematic view of the continuously dissolving facility of the present embodiment.

[Pump]

The pump is used for continuously supplying an emulsion comprising a polymer electrolyte and a solvent to a dissolution facility. The pump may be provided downstream or upstream, in a supply direction, of the dissolution facility, both upstream and downstream thereof or within the dissolution facility.

Examples of the types of pump include, but are not particularly limited to, a turbo pump, a piston pump, a plunger pump, a diaphragm pump, a gear pump, a vane pump and a screw pump. Among them, a pump having an excellent pressure resistance in view of safety and high quantitative performance and a high discharge pressure in view of productivity, such as a plunger pump and a diaphragm pump, is preferable. To suppress pulsation, use of a multiple pump or an accumulator is more preferable.

[Dissolution Facility]

The dissolution facility is used for continuously dissolving a polymer electrolyte in a solvent. The dissolution facility is heated by the heating means later described. A polymer electrolyte in an emulsion is dissolved in a solvent when the emulsion passes through the dissolution facility depending upon the conditions within the dissolution facility and a homogeneous electrolyte solution is discharged from the dissolution facility.

The ratio of the heat-transfer area (inner area) of a dissolution facility to the volume of an emulsion within the dissolution facility is preferably 40 to 40000, more preferably 80 to 8000 and further preferably 400 to 2000. If the ratio of the heat-transfer area (inner area) of a dissolution facility to the volume of an emulsion within the dissolution facility falls within the above range, the dissolution efficiency tends to be improved.

Examples of the dissolution facility include, but not particularly limited to, a dissolution facility in which a fluid flowing within the facility follows a plug flow model.

The dissolution facility, although it is not particularly limited, is preferably a tube formed of a metal. As the material for the dissolution facility, a suitable material in view of corrosion resistance may be selected. Examples thereof include a SUS-based material, a Hastelloy-based material, a titanium-based material, a zirconia-based material and a tantalum-based material. Among them, in consideration of balance between corrosion resistance and cost, a SUS-based material and a material having the same composition as in Hastelloy (registered trade mark of Haynes International, Inc. in the United States) are preferable. Of them, SUS316 and a material having the same composition as in Hastelloy C are preferable. Of them, a material having the same composition as in Hastelloy C276 is preferable. Note that the same compositions as in Hastelloy, Hastelloy C and Hastelloy C276 refer to compositions comprising Ni (56 to 60 mass %), Cr (16 to 22 mass %), Mo (13 to 16 mass %), W (2 to 6 mass %), Fe (3 to 8 mass %) and Co (2.5 mass % or less). If a dissolution facility made of such a metal is used, the dissolution step can be performed at a relatively high temperature and at a high pressure, and the polymer electrolyte to be contained in the resultant electrolyte solution tends to have a polymer chain with relatively stable ends. The inner wall of the tube may have lining. Examples of the lining, although it is not particularly limited to, include fluorine lining and glass lining. If a dissolution facility provided with such lining is used, the dissolution step can be performed at a relatively low temperature and at a low pressure, with the result that the concentrations of F ions and Fe ions of the resultant electrolyte solution tend to be suppressed to a low level.

As the form of the dissolution facility, although it is not particularly limited, for example, a tube form is preferable. If the dissolution facility has a tube form, productivity and dissolution efficiency tend to more improve. The tube form is not particularly limited. Examples of the tube form include a linear, coil and angular tubes. Among them, a coil tube is preferable in view of footprint and stable operation. The outer diameter of the tube, in view of productivity and dissolution efficiency, is preferably 1/16 to 2 inches and more preferably 1/4 to 1/2 inches. Note that, pipes of 6 A to 500 A generally available in the market may be used. In view of productivity and dissolution efficiency, e.g., an in-line mixer, wire mesh and metal filling may be provided in the tube.

The wall thickness of the tube, although it is not particularly limited, may be appropriately selected in view of pressure resistance. The inner diameter of the tube is preferably 1 to 50 mm and more preferably 4 to 50 mm, in view of productivity and dissolution efficiency.

The surface of the inner wall of a tube may be a rough or mirror surface. In view of dissolution efficiency, a maximum height of the projections and depressions is preferably 50 μm or less, more preferably 25 μm or less and further preferably 10 μm or less. The maximum height is obtained, for example, by using a laser microscope, taking a standard length alone from a roughness curve, in the direction of its average line, and measuring the interval between the summit line and the valley line of the part thus taken along the direction of the longitudinal magnification of the roughness curve.

The length of a tube is determined depending upon the requisite dissolution time (=residence time). More specifically, the length of the tube can be calculated based on the inner diameter of the tube so that a product of dissolution time (min) and a feed rate (L/min) becomes equal to or more than the content volume of the heated tube.

Dissolution time (min)×feed rate (L/min)≥content volume of tube

Content volume of tube=(tube inner diameter/2)$^2$×π× tube length

When a plurality of dissolution facilities (tubes) are used in series, e.g., unions (whose shapes may be the same or different), T-type unions for connecting the dissolution facilities, a check valve, a safety valve, a back pressure regulating valve, a pressure gauge and a thermometer may be provided between the dissolution facilities. Note that, if a plurality of dissolution facilities are arranged next to each other, thereby increasing the content volume, productivity can be improved.

[Heating Means]

The heating means is used for heating a dissolution facility. Examples of the heating method, although it is not particularly limited to, include a method of using e.g., a heating medium such as hot air, hot water, steam and silicone oil for heating a dissolution facility. Among them, hot air is preferable since it is easy to use. A dissolution facility can be placed in a thermostatic bath an atmosphere of which is set at a particular temperature by hot air.

[Pressure Control Means]

It is preferable that the continuously dissolving facility of the present embodiment further has a pressure control means, which controls the pressure within a dissolution facility so as to exceed the vapor pressure of a solvent at the heating temperature of the dissolution facility. The pressure control means may be provided downstream or upstream, in a supply direction, of the dissolution facility, both upstream and downstream thereof or within the dissolution facility.

Examples of the pressure control means, although it is not particularly limited to, include a back pressure regulating valve, an automatic pressure regulating valve (PIC) and a pump (described above). If the back pressure regulating valve or an automatic pressure regulating valve (PIC) is used to thereby maintain the pressure within a dissolution facility to be constant, in other words, suppress pressure fluctuation as much as possible, the dispersibility of an electrolyte solution is improved and clogging in a dissolution facility tends to be prevented. Furthermore, if the pump is used, the interior pressure of the dissolution facility can be increased.

Note that a portion from the pump to the pressure control means (back pressure regulating valve) can be regarded as a closed reactor having a constant pressure. If such a continuously dissolving facility is employed, the dispersibility of a fluorine-based polymer electrolyte in an electrolyte solution is more improved. In addition, such an electrolyte solution improved in dispersibility tends to be obtained at a higher concentration and in a shorter time.

[Cooling Means]

The continuously dissolving facility of the present embodiment preferably has a cooling means, which cools an electrolyte solution while maintaining the pressure beyond vapor pressure of a solvent at the heating temperature within the dissolution facility, downstream of the dissolution facility. If such a cooling means is employed, clogging within the dissolution facility caused in discharging the electrolyte solution tends to be more successfully suppressed.

Examples of the cooling method, although it is not particularly limited to, include a method of cooling an electrolyte solution by allowing the electrolyte solution to pass through a cooling pipe and a method of air-cooling an electrolyte solution by allowing the electrolyte solution to pass through a tube of room temperature without passing through the cooling pipe.

[Electrolyte Solution (First Embodiment)]

The electrolyte solution of the first embodiment can be obtained by a method for producing an electrolyte solution as mentioned above or produced by a continuously dissolving facility as mentioned above.

If such an electrolyte solution is used, an electrolyte solution having a polymer electrolyte highly dispersed therein can be provided. Furthermore, if such an electrolyte solution is used, an electrolyte membrane and electrode catalyst layer having high hot water dissolution resistance can be provided. Note that electrolyte solution of the first embodiment may contain the contents of the electrolyte solution of the first embodiment described later.

[Electrolyte Solution (Second Embodiment)]

The electrolyte solution of the second embodiment contains a fluorine-based polymer electrolyte having a $SO_3X$ group (X is an alkali metal, an alkaline-earth metal or $NR_1R_2R_3R_4$ where $R_1, R_2, R_3$ and $R_4$ are each independently an alkyl group having 1 to 3 carbon atoms or hydrogen) and a water-based solvent. In the electrolyte solution of the second embodiment, in dynamic light scattering particle-size measurement, at least one particle-size peak top (A) within the range of 0.10 or more and less than 5.0 μm and at least one particle-size peak top (B) within the range of 5.0 or more and 50.0 μm or less are present; and the scattering intensity ratio (A/B) of the particle-size peak top (A) to the particle-size peak top (B) is $1.0 \times 10^{-2}$ or more and $1.0 \times 10$ or less; and the fluorine ion concentration (mass %) is 500 ppm or less based on the solid-content mass of the fluorine-based polymer electrolyte.

If such an electrolyte solution is used, an electrolyte solution having a fluorine-based electrolyte highly dispersed therein and low fluorine ion concentration can be provided. In addition, if such an electrolyte solution is used, an electrolyte membrane and electrode catalyst layer having high hot water dissolution resistance can be provided.

The method for producing an electrolyte solution of the second embodiment, although it is not particularly limited, is, for example, a method of dissolving a polymer electrolyte by supplying a solvent comprising particles of a polymer electrolyte and water to a closed reactor such as an autoclave made of SUS316, replacing the interior atmosphere of the autoclave with an inert gas such as nitrogen; and heating the internal solution while stirring. Alternatively, in other embodiment, a production method of continuously dissolving a polymer electrolyte by the aforementioned dissolution facility is mentioned. In view of high chemical durability and productivity, the latter production method is preferable.

Now, these electrolyte solutions will be more specifically described below.

(Fluorine-Based Polymer Electrolyte)

If a fluorine-based polymer electrolyte having an $—SO_3X$ group is used, the solubility of the polymer electrolyte to a solvent is more improved. Furthermore, as the fluorine-based polymer electrolyte, although it is not particularly limited, for example, a fluorine-based polymer electrolyte containing a copolymer having a repeating unit represented by the following formula (1) and a repeating unit represented by the following formula (2), is preferable.

  (1)

(in the above formula (1), Z represents H, Cl, F or a perfluoroalkyl group having 1 to 3 carbon atoms).

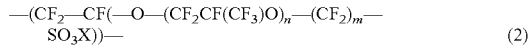  (2)

(in the above formula (2), X is hydrogen, an alkali metal, an alkaline-earth metal, or $NR_1R_2R_3R_4$ where $R_1$, $R_2$, $R_3$ and $R_4$ are each independently an alkyl group having 1 to 3 carbon atoms or hydrogen; m is an integer of 0 to 12; and n is an integer of 0 to 2, with the proviso that m and n are not simultaneously 0).

Among them, a fluorine-based polymer electrolyte in which Z is F, X is K, Na or Li, n is 0 and m is 2 is preferable. Furthermore, a fluorine-based polymer electrolyte in which Z is F, X is Na, n is 0 and m is 2 is more preferable. If such a fluorine-based polymer electrolyte is used, dispersibility tends to be more improved.

The fluorine-based polymer electrolyte may have other functional groups. Examples of other functional groups include, but are not particularly limited to, an —$SO_2F$ group, a —$CF_2H$ group and a —$CF_3$ group.

The average particle diameter of a fluorine-based polymer electrolyte in an electrolyte solution obtained by the dynamic light scattering particle-size measurement is preferably 10 nm or more and less than 500 nm, more preferably 50 nm or more and 300 nm or less and further average particle diameter of a fluorine-based polymer electrolyte falls within the above range, the stability of particles of the fluorine-based polymer electrolyte is improved and particles of the fluorine-based polymer electrolyte can be easily produced. Note that the average particle diameter can be determined by the dynamic light scattering particle-size measurement described in Examples.

(Equivalent Mass)

The equivalent mass of a fluorine-based polymer electrolyte in an electrolyte solution is preferably 300 to 1,000 g/eq, more preferably 400 to 900 g/eq and further preferably 500 to 800 g/eq. If the equivalent mass is 300 g/eq or more, e.g., an electrolyte membrane having further excellent power generation performance tends to be obtained. In contrast, if the equivalent mass is 1,000 g/eq or less, e.g., an electrolyte membrane having lower water-absorbing property and more excellent mechanical strength tends to be obtained. The "equivalent mass of a fluorine-based polymer electrolyte" herein refers to a dry mass per equivalent of a sulfonate group. Note that equivalent mass of a fluorine-based polymer electrolyte can be measured by the method described in Examples (described later).

(Solid-Content Concentration)

The solid-content concentration of a fluorine-based polymer electrolyte in an electrolyte solution is preferably 11 to 50 mass %, more preferably 15 to 45 mass % and further preferably 20 to 40 mass %. If the solid-content is 11 mass % or more, the yield per unit time tends to become more excellent. In contrast, if the solid-content is 50 mass % or less, difficulty of handling due to an increase in viscosity tends to be more suppressed. The solid-content concentration can be measured by the method described in Examples.

(Melt Flow Rate)

As an index for the degree of polymerization of a fluorine-based polymer electrolyte in an electrolyte solution, a melt flow rate (hereinafter referred to also as "MFR") can be used. The MFR of a fluorine-based polymer electrolyte is preferably 100 g/10 minutes or less, more preferably 10 g/10 minutes or less and further preferably 5 g/10 minutes or less. If MFR is 100 g/10 minutes or less, the output characteristics of a fuel cell tend to be successfully maintained for a longer time. Furthermore, MFR is preferably 0.01 g/10 minutes or more, more preferably 0.1 g/10 minutes or more and further preferably 0.3 g/10 minutes or more. If the MFR is 0.01 g/10 minutes or more, a fluorine-based polymer electrolyte tends to be successfully and more effectively dissolved. Note that MFR can be measured by the method described in Examples.

(Spherical Shape)

The particles of a fluorine-based polymer electrolyte in an electrolyte solution are preferably spherical. The "spherical" herein refers to a shape having an aspect ratio of 3.0 or less. Generally, as the aspect ratio of a shape becomes closer to 1.0, the shape becomes closer to a sphere. The aspect ratio of the spherical particles is preferably 3.0 or less, more preferably 2.0 and further preferably 1.5. The lower limit of the aspect ratio of the spherical particles is preferably 1.0. If the aspect ratio falls within the above range, the viscosity of the electrolyte solution further decreases and handling tends to be improved even if the solid-content mass of a fluorine-based polymer electrolyte is increased. Note that the aspect ratio can be measured by the method described in Examples.

(Solvent)

Examples of the water-containing solvent include, but not particularly limited to, water or a water-organic solvent mixed solvent. Examples of such an organic solvent include, but not particularly limited to, protic organic solvents such as an alcohol and glycerin; and aprotic solvents such as N,N-dimethylformamide, N,N-dimethylacetamide and N-methylpyrrolidone. These can be used alone or in combination of two or more.

As the alcohol, although it is not particularly limited, for example, a low-boiling point alcohol having 1 to 3 carbon atoms is preferable. These alcohols may be used alone or in combination of two or more. Examples of the low boiling-point alcohol having 1 to 3 carbon atoms include, but not particularly limited to, at least one alcohol selected from the group consisting of methanol, ethanol, 1-propanol and 2-propanol. Among them, ethanol and 1-propanol are preferable. If such an alcohol is used, the dispersibility of a fluorine-based polymer electrolyte in an electrolyte solution tends to be more improved and the affinity of the fluorine-based polymer electrolyte tends to be more improved.

The content of water in a solvent is preferably 80 to 100 mass %, more preferably 90 to 100 mass % or more and further preferably 100 mass %. If the concentration of water is the above concentration, the dispersibility of a fluorine-based polymer electrolyte in an electrolyte solution tends to be more improved. Because of this, the solid-content mass of the fluorine-based polymer electrolyte tends to be successfully improved.

The content of an organic solvent in the solvent is preferably 0 to 50 mass %, more preferably 0 to 20 mass %, further preferably 0 to 10 mass % and still further preferably 0 mass %. If the concentration of an organic solvent is the above concentration, the dispersibility of a fluorine-based polymer electrolyte in an electrolyte solution tends to be more improved. Because of this, the solid-content mass of the fluorine-based polymer electrolyte tends to be successfully increased. Furthermore, using no flammable organic solvent is preferable in a safety point of view.

(Fluorine Ion Concentration)

The fluorine ion concentration (mass %) is used for indicating degree of decomposition of a fluorine-based polymer electrolyte in an electrolyte solution. More specifically, if the concentration of a fluorine ion in an electrolyte solution is high, the decomposition of a fluorine-based polymer electrolyte has proceeded. Because of this, the fluorine ion concentration of an electrolyte solution is 500 ppm or less based on the solid-content mass of a fluorine-based polymer electrolyte, preferably 300 ppm or less and more preferably 200 ppm or less. Furthermore, the fluorine ion concentration is preferably lower, more preferably 0.10 ppm or more and further preferably 0 ppm or more. If the fluorine ion concentration is 500 ppm or less, the decomposition amount a fluorine-based polymer electrolyte is not large. Thus, the electrolyte membrane and electrode produced by the electrolyte solution have more excellent hot water dissolution resistance. The fluorine ion concentration can be increased by increasing dissolution time or dissolution temperature and decreased by decreasing dissolution time or dissolution temperature. Note that fluorine ion concentration can be measured by the method described in Examples later described.

The thermal decomposition initiation temperature of a fluorine-based polymer electrolyte is preferably 150° C. or more, more preferably 250° C. or more and further preferably 350° C. or more. The upper limit of the thermal decomposition initiation temperature of a fluorine-based polymer electrolyte, although it is not particularly limited, is preferably higher but the thermal decomposition initiation temperature of polytetrafluoroethylene, i.e., 390° C. or less. If the thermal decomposition initiation temperature falls within the above range, the fluorine ion concentration of an electrolyte solution tends to be lower. The thermal decomposition initiation temperature of a fluorine-based polymer electrolyte is increased if X of —$SO_3X$ of the above formula (2) is replaced to obtain H-type; and decreased if X of —$SO_3X$ of the above formula (2) is replaced to obtain a salt type. Note that such a thermal decomposition initiation temperature can be measured by a differential heat/thermogravimetric simultaneous measurement device.

[Scattering Intensity Ratio in Dynamic Light Scattering Particle-Size Measurement]

In the dynamic light scattering particle-size measurement, with respect to an electrolyte solution, at least one particle-size peak top (A) within the range of 0.1 or more to less than 5.0 μm and at least one particle-size peak top (B) within the range of 5.0 or more and 50.0 μm or less are obtained. The scattering intensity ratio (A/B) of the particle-size peak top (A) to the particle-size peak top (B) is $1.0 \times 10^{-2}$ or more and $1.0 \times 10$ or less. The scattering intensity ratio in the dynamic light scattering particle-size measurement is used for determining dispersibility of a polymer electrolyte in an electrolyte solution, in other words, can be used as a measure of dissolution. The scattering intensity ratio can be measured by the method described in Examples described later.

The ratio (A/B) of a scattering intensity (1/nm) is preferably $1.0 \times 10^{-2}$ or more and $1.0 \times 10$ or less, more preferably $1.0 \times 10^{-1}$ or more and 5.0 or less and further preferably $5.0 \times 10^{-1}$ or more and 2.0 or less. If the scattering intensity ratio is $1.0 \times 10$ or less, a polymer electrolyte is sufficiently dissolved and dispersibility is further improved. In short, the larger the particle-size peak (B) than (A), the more the dispersibility tends to be improved. This was experimentally found by the dynamic light scattering particle-size measurement of the electrolyte solutions sampled with the passage of time; however the reason for this is not found. The scattering intensity ratio of $1.0 \times 10^{-2}$ or less means that a polymer electrolyte is conceivably decomposed and reduced in molecular mass; however it does not means only this phenomenon. The scattering intensity ratio A/B can be increased by decreasing the residence time or dissolution temperature and decreased by increasing the residence time or dissolution temperature.

The difference in particle size between the particle-size peak top (A) and the particle-size peak top (B) is preferably 1 to 49.9 μm, more preferably 5 to 40 μm and further preferably 10 to 30 μm. If the difference in particle size between the particle-size peak top (A) and the particle-size peak top (B) falls within the above range, a polymer electrolyte is sufficiently dissolved and dispersibility tends to be more increased.

[Transmittance in UV Measurement]

In the present embodiment, in addition to the scattering intensity ratio obtained in the dynamic light scattering particle-size measurement, transmittance in UV measurement of a solution having a solid-content of 20 mass % at a wavelength of 800 nm also can be used as a base for determining dissolution. The transmittance of the electrolyte solution is preferably 90% T or more, preferably 95% T or more and preferably 98% T or more. If the transmittance is 90% T or more, the polymer electrolyte is sufficiently dissolved and dispersibility tends to be high. The UV measurement can be performed by the method described in Examples described later.

[Scattering Peak in Laser Diffraction/Scattering Particle Size Distribution Measurement]

It is preferable that, in the laser diffraction/scattering particle size distribution measurement, no scattering peak is observed with respect to the electrolyte solution. Based on the presence or absence of a scattering peak in the laser diffraction/scattering particle size distribution measurement, whether dissolution sufficiently proceeds or not can be determined. In other words, if a scattering peak is present, it is suggested that a polymer electrolyte is not sufficiently dissolved or remains undissolved. In contrast, if a scattering peak is not present, it is suggested that a polymer electrolyte is sufficiently dissolved. In the laser diffraction/scattering particle size distribution measurement, the scattering peak can be measured by the method described in Examples described later.

[Electrolyte Solution (Third Embodiment)]

The electrolyte solution of the third embodiment contains a fluorine-based polymer electrolyte. Forty % or more of a polymer electrolyte chain terminal of the fluorine-based polymer electrolyte is —$CF_2H$. The fluorine ion concentration (mass %) is 0.10 to 500 ppm based on the solid-content mass of the fluorine-based polymer electrolyte. The Fe concentration is 0.010 to 10 ppm based on the solid-content mass of the fluorine-based polymer electrolyte.

If such an electrolyte solution is used, an electrolyte membrane and electrode catalyst layer having high hot water dissolution resistance can be provided.

Examples of the method for producing an electrolyte solution according to the third embodiment include, but not particularly limited to, a method of dissolving a polymer electrolyte by placing particles of a polymer electrolyte and water-containing solvent in a closed reactor such as an autoclave made of SUS316, substituting the interior atmosphere of the autoclave with an inert gas such as nitrogen; and heating the internal solution while stirring. As another method, a production method by continuously dissolving a polymer electrolyte in the aforementioned dissolution facility is mentioned. In view of high chemical durability and productivity, the latter production method is preferable.
(Ratio of —$CF_2H$ Group)

Examples of the structure of a polymer chain terminal of a fluorine-based polymer electrolyte contained in an electrolyte solution, include a —$CF_2H$ group, a —$CF_3$ group, a —COOH group and a —COONa group. Among them, a —$CF_2H$ group is preferable. The amount of —$CF_2H$ group based on the total number of polymer chain terminals of a fluorine-based polymer electrolyte is preferably 40% or more, more preferably 50% or more and further preferably 90% or more. If 40% or more of the polymer chain terminals consists of —$CF_2H$ group, the Fenton tolerance is more improved compared to the electrolytes having a —COOH group or a —COONa group at a terminal, and the chemical durability of the resultant fuel cell tends to be more improved. In contrast, if 40% or more of the polymer chain terminals consists of a —$CF_2H$ group, since an additional production process after the fluorination step and the like is not required compared to electrolyte having a —$CF_3$ group at a terminal, productivity tends to be more improved.
(Fe Concentration)

The concentration (mass %) of Fe contained in an electrolyte solution based on the solid-content mass of a fluorine-based polymer electrolyte is 0.010 ppm or more and 10 ppm or less, preferably 0.050 ppm or more and 5 ppm or less and more preferably 0.10 ppm or more and 1 ppm or less. If the Fe concentration is 10 ppm or less, the concentration of Fe, which induces generation of radicals during operation of a fuel cell, is low, with the result that deterioration of the electrolyte membrane is suppressed and the chemical durability of a fuel cell tends to be more improved. In contrast, if the Fe concentration is 0.01 ppm or more, the electrolyte solution and membrane can be produced without a step of removing Fe, and productivity tends to be more improved.

Note that electrolyte solutions having characteristics of both the first embodiment and second embodiment, electrolyte solutions having characteristics of both the first embodiment and third embodiment, electrolyte solutions having characteristics of both the second embodiment and third embodiment, and electrolyte solutions having characteristics of all of the first embodiment, second embodiment and third embodiment are included in the range of the electrolyte solution of the present embodiment.

[Electrolyte Membrane (First Embodiment)]

The electrolyte membrane of the first embodiment is formed of an electrolyte solution as mentioned above. Examples of a method for producing the electrolyte membrane of the first embodiment include, but not particularly limited to, a method having a step of applying an electrolyte solution obtained above to a substrate, a step of drying the electrolyte solution applied to the substrate to obtain an electrolyte membrane and a step of removing the electrolyte membrane from the substrate. In this manner, the electrolyte membrane can be produced. The method of producing an electrolyte membrane as mentioned above is called as a cast film-forming method. A film can be obtained by spreading an electrolyte solution in a reactor, for example, a petri dish, heating the dish in e.g., an oven as needed to evaporate at least part of a solvent, and then peeling the film from the reactor. Alternatively, a sheet-form coating film can be obtained by applying an electrolyte solution to e.g., a glass plate or a film such that the thickness is controlled to be uniform by a device such as a blade coater, a gravure coater or a comma coater having a mechanism such as a blade, an air knife or a reverse roll in accordance with the manner of a cast film formation. Furthermore, a film is continuously formed by continuous casting to obtain a long sheet like film.

Examples of the film serving as a substrate include, but are not particularly limited to, poly(ethylene terephthalate) (PET), poly(butylene terephthalate) (PBT), polyethylene naphthalate (PEN), polyester including a liquid crystal polyester, triacetyl cellulose (TAC), polyarylate, polyether, polycarbonate (PC), polysulfone, polyether sulfone, cellophane, aromatic polyamide, polyvinyl alcohol, polyethylene (PE), polypropylene (PP), poly(vinyl chloride) (PVC), polystyrene (PS), an acrylonitrile-butadiene-styrene copolymer (ABS), polymethyl methacrylate (PMMA), polyamide, polyacetal (POM), poly(phenylene ether) (PPE), poly(phenylene sulfide) (PPS), polyamideimide (PAI), polyether amide (PEI), polyetheretherketone (PEEK), polyimide (PI), polymethylpentene (PMP), polytetrafluoroethylene, (PTFE), fluorinated ethylene-propylene (FEP), a tetrafluoroethylene-ethylene (ETFE) copolymers, poly(vinylidene fluoride) (PVDF), polybenzazole (PBZ), polybenzoxazole (PBO), polybenzothiazole (PBT), polybenzimidazole (PBI) and poly(paraphenylene terephthalic imide) (PPTA).

[Electrolyte Membrane (Second Embodiment)]

The electrolyte membrane of the second embodiment contains a fluorine-based polymer electrolyte. Forty % or more of a polymer electrolyte chain terminal of the fluorine-based polymer electrolyte is —$CF_2H$. The fluorine ion concentration (mass %) is 0.10 to 500 ppm based on the solid-content mass of the fluorine-based polymer electrolyte. The Fe concentration (mass %) is 0.01 to 10 ppm based on the solid-content mass of the fluorine-based polymer electrolyte.

If the amount of fluorine-based polymer electrolyte chain terminal and the amount of Fe are set at predetermined amounts, the chemical durability of the fuel cell is more improved.

A method for producing such an electrolyte membrane, although it is not particularly limited, may be a method of dissolving a polymer electrolyte by placing particles of a polymer electrolyte and a solvent containing water to a closed reactor such as an autoclave made of SUS316; substituting the interior atmosphere of the autoclave with an inert gas such as nitrogen; and heating the internal solution while stirring. As another method, a production method by continuously dissolving a polymer electrolyte in the aforementioned dissolution facility is mentioned. In view of high chemical durability and productivity, the latter production method is preferable.

(Ratio of —$CF_2H$ group)

Examples of the structure of a polymer chain terminal of a fluorine-based polymer electrolyte contained in an electrolyte solution, include a —$CF_2H$ group, a —$CF_3$ group, a —COOH group and a —COONa group. Among them, —$CF_2H$ group is preferable. The amount of —$CF_2H$ group based on the total number of polymer chain terminals of a fluorine-based polymer electrolyte is preferably 40% or more, more preferably 50% or more and further preferably 90% or more. If 40% or more of the polymer chain terminals consists of —$CF_2H$ group, the Fenton tolerance is more improved compared to the electrolyte membrane having a —COOH group or a —COONa group at a terminal, and the chemical durability of the resultant fuel cell tends to be more improved. In contrast, if 40% or more of the polymer chain terminals consists of a —$CF_2H$ group, since an additional production process after the fluorination step and the like is not required compared to an electrolyte membrane having a —CF$_3$ group at a terminal, productivity tends to be more improved.

(Fe Concentration)

The concentration (mass %) of Fe contained in an electrolyte membrane based on the solid-content mass of the fluorine-based polymer electrolyte is 0.010 ppm or more and 10 ppm or less, preferably 0.050 ppm or more and 5 ppm or less and more preferably 0.10 ppm or more and 1 ppm or less. If the Fe concentration is 10 ppm or less, the concentration of Fe, which induces generation of radicals during operation of a fuel cell, is low, with the result that deterioration of the electrolyte membrane is suppressed and the chemical durability of a fuel cell tends to be more improved. In contrast, if the Fe concentration is 0.01 ppm or more, the electrolyte solution and membrane can be produced without a step of removing Fe, and productivity tends to be more improved.

Note that electrolyte membranes having characteristics of both the first embodiment and second embodiment, electrolyte membranes having characteristics of both the first embodiment and third embodiment, electrolyte membranes having characteristics of both the second embodiment and third embodiment, and electrolyte membranes having characteristics of all of the first embodiment, second embodiment and third embodiment are included in the range of the electrolyte membrane of the present embodiment.

[Electrode Catalyst Layer]

The electrode catalyst layer according to the present embodiment is formed of the electrolyte solution of the first embodiment or the second embodiment. The electrode catalyst layer according to the present embodiment can contain composite particles containing fine particles of a catalytic metal and a conductive agent, and a fluorine-based polymer electrolyte contained in the electrolyte solution serving as a binder. Furthermore, the electrode catalyst layer may contain a water repellent agent as needed.

Examples of the catalytic metal to be used in the electrode catalyst layer include, but not particularly limited to, a metal accelerating an oxidation reaction of hydrogen and a reductive reaction of oxygen. Preferable specific examples of such a metal include, but not particularly limited to, at least one metal selected from the group consisting of platinum, gold, silver, palladium, iridium, rhodium, ruthenium, iron, cobalt, nickel, chromium, tungsten, manganese, vanadium and alloys of these. Among them, principally, platinum is used.

As the conductive agent, although it is not particularly limited as long as it consists of particles having conductivity (conductive particles), for example, at least one type of conductive particle selected from the group consisting of carbon black such as furnace black, channel black and acetylene black and activated carbon, graphite and various type of metals, is preferable.

The particle diameter of the conductive agents is not particularly limited, preferably 10 angstroms to 10 μm, more preferably 50 angstroms to 1 μm and further preferably 100 to 5,000 angstroms. If the particle diameter falls within the above range, the surface area is increased and the effect of efficiently dispersing and carrying catalytic metal fine particles tends to be more improved.

The particle diameter of a catalytic metal fine particles (electrode catalyst particles), although it is not particularly limited, is preferably 10 to 1,000 angstroms, more preferably 10 to 500 angstroms, further preferably 15 to 100 angstroms. If the particle diameter falls within the above range, the surface area is increased and the contact area with a binder electrolyte tends to be further and successfully increased.

The composite particles contain the catalytic metal particles in an amount of preferably 1 to 99 mass %, more preferably 10 to 90 mass % and further preferably 30 to 70 mass % based on the conductive particles. More specifically, Pt catalyst-carrying carbon such as TEC10E40E manufactured by Tanaka Kikinzoku Kogyo k. k. can be mentioned as a suitable example. If the content falls within the above range, a desired catalyst activity tends to be more easily obtained.

The amount of catalyst carried by the electrode catalyst layer based on the electrode area in the state where an electrode catalyst layer is formed, is preferably 0.001 to 10 mg/cm$^2$, more preferably 0.01 to 5 mg/cm$^2$ and further preferably 0.1 to 1 mg/cm$^2$. The thickness of the electrode catalyst layer is preferably 0.01 to 50 μm, more preferably 0.1 to 30 μm and further preferably 1 to 20 μm. If the amount of catalyst and the thickness fall within the above ranges, an electrode catalyst layer having such a sufficient amount of carrier that can show sufficient power generation performance, can be easily formed; at the same time, a reduction in diffusivity of a gas within the electrode catalyst layer tends to be successfully suppressed.

The porosity of the electrode catalyst layer, although it is not particularly limited, is preferably 10 to 90 vol %, more preferably 20 to 80 vol % and further preferably 30 to 60 vol %. If the porosity falls within the above range, protonic conductivity is more satisfactorily obtained; at the same time, diffusivity of a fuel gas and water generated by the power generation tends to be easily improved.

To improve water repellency, the electrode catalyst layer may further contain polytetrafluoroethylene (hereinafter referred to as "PTFE"). In this case, the shape of PTFE is not particularly limited as long as it preferable. These may be used alone or as a mixture. When the electrode catalyst layer contains PTFE, the content of PTFE based on the total mass of the electrode catalyst layer is preferably 0.001 to 20 mass %, more preferably 0.01 to 10 mass % and further preferably 0.1 to 5 mass %. If the content falls within the above range, the water repellency tends to become more excellent.

To improve hydrophilicity, the electrode catalyst layer of the present embodiment may further contain a metal oxide. In this case, as the metal oxide, although it is not particularly limited to, for example, at least one metal oxide selected from the group consisting of Al2O3, B2O3, MgO, SiO2, SnO2, TiO2, V2O5, WO3, Y2O3, ZrO2, Zr2O3 and ZrSiO4, is preferable. Of them, at least one metal oxide selected from the group consisting of Al2O3, SiO2, TiO2 and ZrO2 is more preferable and SiO2 is further preferable.

In the present embodiment, in the case where an electrode catalyst layer contains a metal oxide, the content of the metal oxide based on the total mass of the electrode catalyst layer is preferably 0.001 to 20 mass %, more preferably 0.01 to 10 mass % and further preferably 0.1 to 5 mass %. As the shape of a metal oxide, particulate and fibrous form can be used. Among them, particularly infinite from is preferable. The "infinite" herein means that metal oxides of particulate or fibrous form are not seen by use of an optical microscope and an electron microscope. In particular, it is meant that even if an image of the electrode catalyst layer is magnified up to six-figure times by a scanning electron microscope (SEM), particulate and fibrous form metal oxides are not observed; and that even if an image of the electrode catalyst layer is magnified up to six-figure times to several millions times by a transmission electron microscope (TEM), particulate and fibrous form metal oxides are not clearly observed. Likewise, the "infinite" means that particulate and fibrous form metal oxides are not observed within the range of current microscopic techniques.

If the aforementioned electrode catalyst layer is used, a fuel cell rarely causing flooding and providing high output can be obtained. This is probably because the water content is successfully reduced and the drainage of the electrode becomes excellent.

The electrode catalyst composition for forming the electrode catalyst layer may be used, if necessary, by further adding a solvent. Examples of the solvent that can be used, although it is not particularly limited, include water; alcohols such as ethanol, 2-propanol, ethylene glycol and glycerin; CFC, HCFC, and HFC; of mixtures of these solvents. The addition amount of such a solvent based on the total mass of the electrode catalyst composition is preferably 0.1 to 90 mass %, more preferably 1 to 50 mass % and further preferably 5 to 20 mass %.

Examples of a method for producing an electrode catalyst layer include, but not particularly limited to, a method having a step of preparing an electrode catalyst composition by dispersing a composite particle containing a catalytic metal and a conductive agent in an electrolyte solution as mentioned above, a step of applying the electrode catalyst composition to a substrate and a step of drying the electrode catalyst composition applied to the substrate to obtain the electrode catalyst layer. More specifically, the electrode catalyst layer can be formed by preparing an electrode catalyst composition by dispersing a composite particle in an electrolyte solution and applying the composition onto the electrolyte membrane or a substrate such as a PTFE sheet, and then drying the composition to solidify it. Note that, the electrode catalyst composition in this embodiment can be applied in accordance with any method generally known in the art such as a screen printing method and a spray method.

Alternatively, the electrode catalyst layer of the present embodiment can be also obtained by applying the electrode catalyst composition as mentioned above to a gas diffusion electrode such as ELAT (registered trade mark, manufactured by BASF), which is formed by laminating a gas diffusion layer and an electrode catalyst layer, by coating or dipping, followed by drying to solidify the composition.

[Membrane Electrode Assembly]

The membrane electrode assembly according to this embodiment has an electrolyte membrane and an electrode catalyst layer as mentioned above. The membrane electrode assembly in the present embodiment (hereinafter referred to as "MEA") refers to an assembly unit prepared by joining two types of electrode catalyst layers, i.e., anode and cathode, to two surfaces of the electrolyte membrane, respectively.

Examples of a method for producing the membrane electrode assembly include, but not particularly limited to, a method of producing a membrane electrode assembly by laminating the electrolyte membrane obtained by a production method as mentioned above and electrode catalyst layers. Alternatively, a membrane electrode assembly can be also obtained by directly applying an electrode catalyst composition to an electrolyte membrane by coating or dipping, and then drying to solidify the composition. Furthermore, a membrane electrode assembly can be obtained by hot press of an electrolyte membrane and electrode catalyst layers. Note that an assembly obtained by joining a pair of gas diffusion layers on the outer side of electrode catalyst layers so as to face each other is sometimes called as MEA.

[Fuel Cell]

The fuel cell according to this embodiment has a membrane electrode assembly as mentioned above. The MEA obtained as mentioned above is further combined to structural components such as a bipolar plate and a backing plate that are used in general solid polymer electrolyte fuel cells, to form a solid polymer electrolyte fuel cell. Such a solid polymer electrolyte fuel cell is not limited as long as it has the same structure as those known in the art except that the aforementioned MEA is employed as MEA. The bipolar plate refers to a plate formed of e.g., a composite material of graphite and a resin or a metal and having a groove for supplying a gas such as a fuel and an oxidant in the surface. The bipolar plate has a function as a flow channel for supplying a fuel or an oxidant near an electrode catalyst, in addition to a function for allowing electrons to migrate into an external load circuit. MEA is inserted between these bipolar plates and a plurality of resultant structures are laminated to produce a solid polymer electrolyte fuel cell according to this embodiment.

In the foregoing, embodiments for carrying out the present invention have been described; however, the present invention is not limited to the present embodiments. The present invention can be modified in various ways without departing from the spirit of the invention.

EXAMPLES

Now, the present invention will be more specifically described by way of Examples and Comparative Examples; however the present invention is not limited to these Examples alone. Note that the evaluation methods and measurement methods used in Examples and Comparative Examples are as follows.

(1) Method for Measuring Melt Flow Rate (MFR) of Fluorine-Based Polymer Electrolyte The melt flow rate (MFR g/10 minutes) of a fluorine-based polymer electrolyte was measured based on JIS K-7210 by using a device having an orifice of 2.09 mm in inner diameter and 8 mm in length at a temperature of 270° C. and a load of 2.16 kg.

(2) Method of Determining the Average Diameter of Particles of Polymer Electrolyte The average particle diameter was obtained based on the following dynamic light scattering particle-size measurement of an electrolyte solution.

(3) Method of Measuring the Aspect Ratio of Particles of Polymer Electrolyte

An aggregate of a polymer electrolyte obtained by applying an emulsion to e.g., aluminum foil and removing a solvent was observed by a scanning electron microscope and an image thereof was taken. On the image, 20 or more particles were selected and measured for major axis and minor axis. The ratios of major axes to minor axes were averaged to obtain the aspect ratio.

(4) Method of Measuring Equivalent Mass of Polymer Electrolyte

The polymer electrolytes obtained in Examples and Comparative Examples, if they were not H-type, were changed into H-type by substitution. The membrane of the H-type polymer electrolyte (0.02 to 0.10 g) was dipped in 50 mL of a saturated aqueous NaCl solution (0.26 g/mL) of 25° C., allowed to stand still for 10 minutes while stirring and subjected to neutralization titration using 0.01 N aqueous sodium hydroxide (special grade chemical, manufactured by Wako Pure Chemical Industries Ltd.) solution with phenolphthalein (special grade chemical, manufactured by Wako Pure Chemical Industries Ltd.) used as an indicator.

More specifically, after neutralization, the resultant Na-type membrane was rinsed with pure water, dried under vacuum and weighed. Assuming that the equivalent amount of sodium hydroxide required for neutralization was represented by M (mmol) and the mass of the Na-type membrane was represented by W (mg), the equivalent mass (g/eq) was obtained in accordance with the following formula.

Equivalent mass=(W/M)−22

(5) Method of Measuring the Solid-Content Concentration in Emulsion and Electrolyte Solution The mass of a dried weighing cup was precisely measured at room temperature and represented by W0. Then an emulsion or an electrolyte solution (1 g) was placed in the weighing cup measured, precisely measured and represented by W1. The weighing cup having the emulsion or the electrolyte solution placed therein was dried by a dryer (type LV-120) manufactured by ESPEC CORP at a temperature of 200° C. for one hour or more and cooled in a desiccator containing silica gel. After cooled to room temperature, the mass of the weighing cup was precisely measured and represented by W2. The above operation was repeated three times. The solid-content concentration of a polymer electrolyte was obtained in accordance with the following equation as an average of the values obtained by three operations.

Solid-content concentration=(W2−W0)/(W1−W0)×100

(6) Method of Measuring Concentration of Water in Emulsion or Electrolyte Solution The concentration of water in emulsion or electrolyte solution was measured by Karl Fischer moisture meter 841 Titrand (manufactured by Metrohm) with aquamicron dehydrating solvent MS (manufactured by API Corporation) used as a dehydrating solvent and HYDRANAL composite 5K (manufactured by Sigma Aldrich Japan) as Karl Fischer's reagent.

(7) Dynamic Light Scattering Particle-Size Measurement Method of Electrolyte Solution and Method of Calculating Scattering Intensity Ratio To determine whether a polymer electrolyte was dissolved or not, i.e., dispersibility, the dynamic light scattering particle-size of an electrolyte solution was measured. When water alone was used as the solvent of the electrolyte solution, a solution composition containing a solid-content of a polymer electrolyte (2.5 mass %) and water (97.5 mass %) was prepared by concentration or dilution operation, as a measurement sample. The dynamic light scattering particle-size was measured by a particle size measurement system, ELS-Z2 plus apparatus (manufactured by Otsuka Electronics Co., Ltd.). More specifically, a measurement sample was set in a disposable cell and irradiated with a semiconductor laser (30 mW, 658 nm). The intensity of 160° scattering light was measured by unit of photons/sec. Measurement was repeated 200 times in total and an average diameter of particles in a measurement sample and particle-size peaks were obtained. From the scattering intensities of the resultant particle-size peaks, a scattering intensity ratio was obtained.

Figure 2:
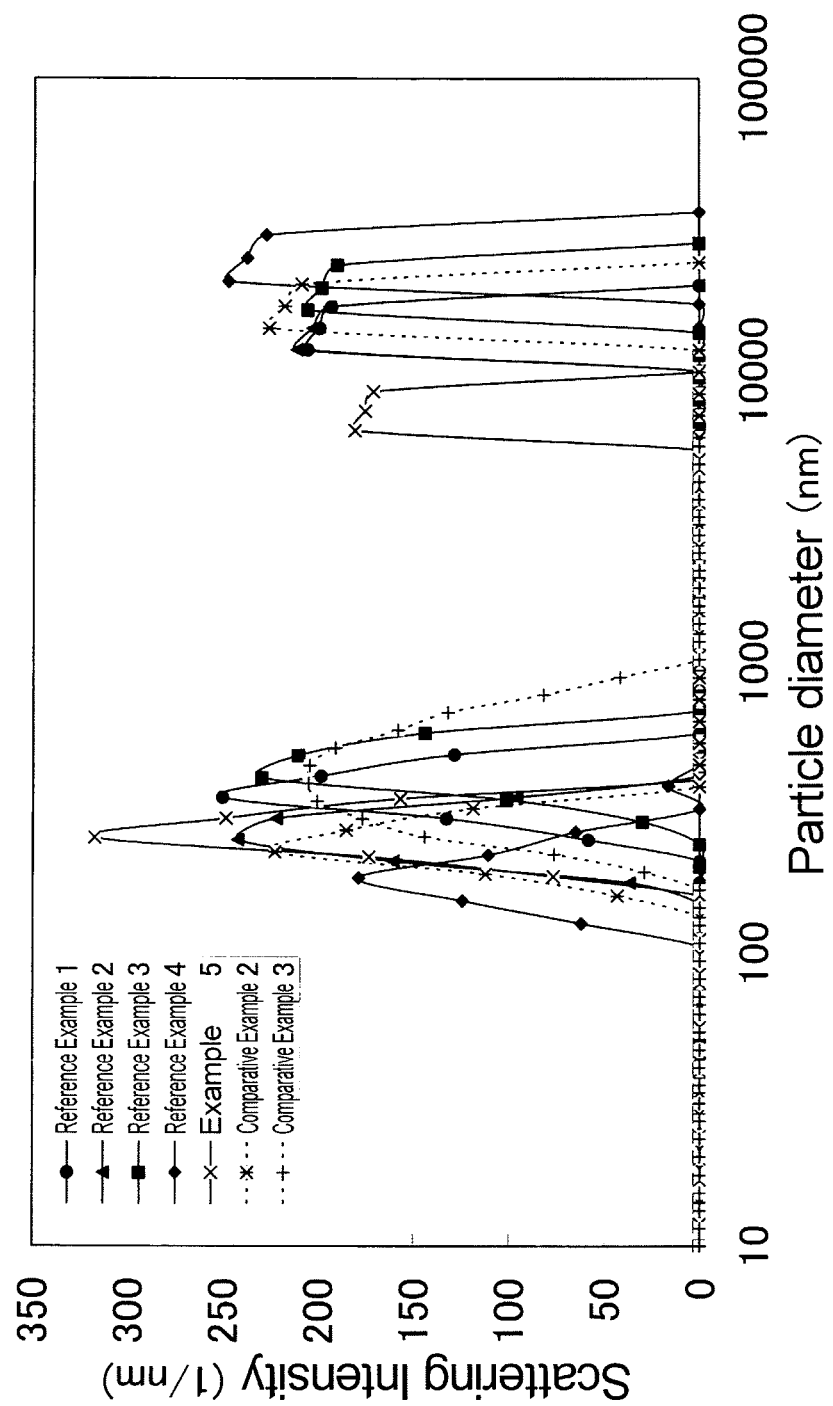
FIG. 2 shows a graph showing the particle distributions of fluorine-based polymer electrolytes in the electrolyte solutions according to Examples and Comparative Examples.

FIG. 2 shows distributions of the particles of fluorine-based polymer electrolytes in electrolyte solutions in Reference Examples 1 to 4, Example 5 and Comparative Examples 2 and 3.

(8) Method of Measuring Transmittance by UV

To determine whether a polymer electrolyte was dissolved or not, transmittance of UV (a wavelength of 800 nm) through an electrolyte solution (a solid-content: 20 mass %) was measured by use of V-550 manufactured by JASCO.

(9) Method of Measuring Scattering Peak in Laser Diffraction/Scattering Particle Size Distribution Measurement of Electrolyte Solution To determine the presence of a polymer electrolyte remaining undissolved, laser diffraction/scattering particle size distribution of an electrolyte solution was measured by using a laser diffraction/scattering particle size distribution measuring device, LA-950, manufactured by HORIBA Ltd. When the electrolyte solution contained bubbles, defoaming treatment was performed under a reduced pressure of −0.08 MPa before measurement.

(10) Method of Determining Clogging

An emulsion was supplied by a pump into a heated tube. Operation was continuously made so as to obtain a desired residence time. The behavior of the solution discharged from a back pressure regulating valve was observed and the presence or absence of clogging was evaluated based on the following criteria.

◯: Clogging was absent: a case where the solution is discharged from back pressure regulating valve at a constant speed Δ: Clogging tended to be present: a case where the speed of the solution discharged from back pressure becomes gradually slow X: Clogging was present: a case where the solution is not discharged from back pressure regulating valve

(11) Evaluation Method of Dissolution

Degree of dissolution was evaluated based on the following evaluation criteria.

◯: Dissolution of a polymer electrolyte was sufficient: a case where the scattering intensity ratio in the dynamic light scattering particle-size measurement is $1.0 \times 10^{-2}$ or more; a case where transmittance (% T) at a wavelength of 800 nm in the UV measurement is 90% T or more; and a case where a scattering peak is present in the laser diffraction/scattering particle size distribution measurement X: Dissolution of a polymer electrolyte was insufficient: a case except for the above cases

(12) Method of Measuring Fluorine Ion Concentration in Electrolyte Solution and Electrolyte Membrane The fluorine ion concentration was measured by using a fluorine ion meter manufactured by THERMO ORION and a fluorine composite electrode. More specifically, a calibration curve was prepared by using three fluorine ion concentrations of 0.1, 1 and 10 ppm; and the fluorine ion concentration in an electrolyte solution was measured with reference to the resultant calibration curve. Note that, if necessary, a measurement sample was diluted with the same solvent as used in an electrolyte solution and at the same dilution ratio, so as to fall within the range of the fluorine ion concentration and subjected to the measurement. In the case of a dilution sample, the resultant measurement value was calculated based on the dilution rate and divided by the solid-content mass of the electrolyte solution to obtain the fluorine ion concentration in the solid-content mass of the fluorine-based polymer electrolyte. In the case of an electrolyte membrane, an electrolyte was dipped in a saturated aqueous solution of sodium chloride and the concentration of fluorine ion eluted in the solution was measured in the same manner as above.

(13) Method of Measuring Concentration of Fe in Electrolyte Solution and Electrolyte Membrane An electrolyte solution or an electrolyte membrane was carbonized in an electric furnace to obtain a carbide, which was washed with a predetermined amount of nitric acid. Fe in the wash solution was quantified by ICP-AES (inductively coupled plasma emission spectrometer) to obtain the concentration of Fe.

(14) Quantitative Determination of Terminal-$CF_2H$ of Electrolyte

The terminal-$CF_2H$ of an electrolyte was quantified by NMR measurement. An electrolyte solution or an electrolyte membrane and N,N'-dimethylacetamide were placed in an outer tube of an NMR tube and heated at 80° C. To the inner tube of a double tube structure, deuterated dimethyl sulfoxide was placed. In this manner, an NMR measurement sample was prepared. The resultant sample was subjected to $^{19}F$-NMR measurement using ECS400 manufactured by Jeol Resonance at a measurement temperature of 120° C. Provided that the chemical shift of the main chain $CF_2$-chain signal was set at −119 ppm, the integral values of —$CF_2$—$CF_2H$ derived signals observed at −137 ppm and −127 ppm were obtained. Provided that the integral value of the same electrolyte lot dissolved at 300° C. for one hour in a batch system was regarded as 100%, the ratio of the —$CF_2H$ terminal group of an electrolyte in each of Examples, Reference Examples and Comparative Examples was calculated.

(15) Method of Measuring Concentration of Alcohol in Electrolyte Solution

The concentration of an alcohol in the electrolyte solution obtained in each of Examples and Comparative Examples was measured by gas chromatography equipment G4000 (manufactured by Shimadzu Corporation) and a capillary column InertCap WAX (inner diameter: 0.25 mm, length: 30 m, thickness: 0.25 μm) manufactured by GL Sciences Inc. More specifically, the concentration of an alcohol was measured as follows. A calibration curve of an alcohol was previously prepared by using 1-butanol (special grade chemical, manufactured by Wako Pure Chemical Industries Ltd.) as an internal standard substance. A measurement sample was prepared by adding an electrolyte solution (1 g), a 1 mass % aqueous 1-butanol solution (1 g) and purified water (18 g). The temperature of an injection port was set at 200° C., the temperature of a hydrogen flame ionization detector was set at 210° C., and the temperature of an oven was set at 60° C. Thereafter, the measurement sample (1 μL) was injected by a microsyringe. Immediately after the injection, the temperature of the oven was increased at a rate of 10° C./min. At the time, a spectrum was measured. From the spectrum, the area of a peak was obtained to measure the concentration of the alcohol.

(16) Method of Evaluating Hot Water Dissolution Resistance of Electrolyte Membrane An electrolyte membrane was allowed to stand still in a constant temperature and humidity room (23° C. and 50% RH) for 24 hours. Thereafter, the mass of the membrane before treatment was measured. Subsequently, the electrolyte membrane was dipped in hot water of 90° C. and treated with heat for 5 hours. Subsequently, while the electrolyte membrane was dipped, the hot water was cooled. Thereafter, the electrolyte membrane was taken out from the water, allowed to stand still in a constant temperature and humidity room (23° C. and 50% RH) for 24 hours and then, the mass of the electrolyte membrane was measured to obtain the mass after treatment. The mass after treatment corresponds to the mass of the electrolyte after treatment. A mass loss ratio of the electrolyte membrane was calculated in accordance with the following equation. It is shown that the lower the mass loss ratio, the higher the hot water dissolution resistance.

Mass loss ratio (%)=(mass before treatment−mass after treatment)/mass before treatment×100

(17) Evaluation of Fuel Cell

To examine battery characteristics (hereinafter referred to as "initial characteristics") of the membrane electrode assembly prepared as described later, a fuel cell was evaluated as follows.

First, an anode-side gas diffusion layer and a cathode-side gas diffusion layer were allowed to face each other. Between these layers, MEA produced as described below was inserted and the resultant construct was integrated into a cell for evaluation. As the anode-side and cathode-side gas diffusion layers, carbon cloth (ELAT (registered trade mark) B-1, manufactured by DE NORA NORTH AMERICA of the United States) was used. The cell for evaluation was placed in an evaluation apparatus (manufactured by CHINO corporation) and increased in temperature to 80° C. Thereafter, hydrogen gas was supplied at a rate of 300 cc/min to the anode side; whereas air gas was supplied at a rate of 800 cc/min to the cathode side. Both the anode side and cathode side were pressurized to a normal pressure or 0.15 MPa (absolute pressure). These gases were previously humidified. Hydrogen gas and air gas were both humidified by a water bubbling method at a desired temperature and supplied to the cell for evaluation. Then, the cell for evaluation was maintained at a cell temperature of 80° C. and at a voltage of 0.7 V for 20 hours under condition under desired humidity conditions and thereafter the current was measured.

Example 1

Through the polymerization step, hydrolysis step and ultrafiltration step described in Example 1 of WO2011/034179, Na-type emulsion (solid-content: 35.0 mass %, water: 65.0 mass %) containing a fluorine-based polymer electrolyte (equivalent mass=710 g/eq) consisting of a copolymer (MFR=3.2 g/10 minutes) of olefin fluoride ($CF_2$=$CF_2$) and a vinyl fluoride compound ($CF_2$=$CF$—O—($CF_2$)$_2$—$SO_3Na$) and having an average particle diameter of 111 nm and an aspect ratio of 1.0, was obtained.

The Na-type emulsion was supplied by a supply pump into a tube (the surfer roughness of the inner wall=1 μm) made of Hastelloy C276 (Ni: 57 mass %, Mo: 17 mass %, Cr: 16 mass %, Fe: 4-7 mass %, W: 3-4.5 mass %, Co≤2.5 mass %) and having an inner diameter of 2.17 mm, allowed to pass through the tube placed in a thermostatic bath set at 290° C. and discharge from a back pressure regulating valve set at 9 MPa to obtain a homogeneous, colorless and transparent electrolyte solution AS1. The residential time of the emulsion in the tube placed in the thermostatic bath set at 290° C. was 7.5 minutes. The scattering intensity ratio A/B of electrolyte solution AS1 in the dynamic light scattering particle-size measurement was 1.8. After electrolyte solution AS1 was diluted with water so as to have a solid-content of 20 mass %, the transmittance of the solution at a wavelength of 800 nm (the UV measurement) was measured. The transmittance was 99.1% T. No laser scattering peak was observed with respect to electrolyte solution AS1. Terminal-$CF_2H$ amount, fluorine ion concentration and Fe concentration are as shown in Table 1.

Example 2

Continuous dissolution was carried out in the same manner as in Example 1 except that the inner diameter of the tube described in Example 1 was set at 7.53 mm and the residence time in the tube (the surface roughness of the inner wall=5 µm) placed in the thermostatic bath was set at 15 minutes. Homogeneous, colorless and transparent electrolyte solution AS2 was obtained from the back pressure regulating valve. The scattering intensity ratio A/B of electrolyte solution AS2 in the dynamic light scattering particle-size measurement was 0.9. After electrolyte solution AS2 was diluted with water so as to have a solid-content of 20 mass %, the transmittance of the solution at a wavelength of 800 nm (the UV measurement) was measured. The transmittance was 99.5% T. No laser scattering peak was observed with respect to electrolyte solution AS2. Terminal-$CF_2H$ amount, fluorine ion concentration and Fe concentration are as shown in Table 1.

Example 3

Continuous dissolution was carried out in the same manner as in Example 1 except that the inner diameter of the tube described in Example 1 was set at 44.8 mm and the residence time in the tube (the surface roughness of the inner wall=5 µm) placed in the thermostatic bath was set at 45 minutes. Homogeneous, colorless and transparent electrolyte solution AS3 was obtained from the back pressure regulating valve. The scattering intensity ratio A/B of electrolyte solution AS3 in the dynamic light scattering particle-size measurement was 0.6. After electrolyte solution AS3 was diluted with water so as to have a solid-content of 20 mass %, the transmittance of the solution at a wavelength of 800 nm (the UV measurement) was measured. The transmittance was 99.1% T. No laser scattering peak was observed with respect to electrolyte solution AS3. Terminal-$CF_2H$ amount, fluorine ion concentration and Fe concentration are as shown in Table 1.

Example 4

Continuous dissolution was carried out in the same manner as in Example 1 except that the back pressure regulating valve described in Example 1 was set at 6 MPa. Homogeneous, colorless and transparent electrolyte solution AS4 was obtained from the back pressure regulating valve. The scattering intensity ratio A/B of electrolyte solution AS4 in the dynamic light scattering particle-size measurement was 2.0. After electrolyte solution AS4 was diluted with water so as to have a solid-content of 20 mass %, the transmittance of the solution at a wavelength of 800 nm (the UV measurement) was measured. The transmittance was 90.5% T. No laser scattering peak was observed with respect to electrolyte solution AS4. The speed of the solution flowing out from the back pressure regulating valve became gradually slow; however, the speed did not reach 0 during the operation of 30 minutes. Furthermore, a safety valve set at 12 MPa was not actuated. From the above, although tendency of clogging was slightly observed, it was able to determine that dissolution can be made. Terminal-$CF_2H$ amount, fluorine ion concentration and Fe concentration are as shown in Table 1.

Comparative Example 1

The Na-type emulsion described in Example 1 was subjected an H-conversion step and an ultrafiltration step to obtain an H-type emulsion (solid-content: 30.1 mass %, water: 69.9 mass %) containing a fluorine-based polymer electrolyte (equivalent mass=710 g/eq), which consisted of a copolymer (MFR=3.2 g/10 minutes) of olefin fluoride ($CF_2=CF_2$) and a vinyl fluoride compound ($CF_2=CF-O-(CF_2)_2-SO_3H$) and had an average particle diameter of 111 nm and an aspect ratio of 1.0. Terminal-$CF_2H$ amount, fluorine ion concentration and Fe concentration are as shown in Table 1. Terminal-$CF_2H$ amount and fluorine ion concentration were small and the amount of Fe was large.

An autoclave made of Hastelloy C276 and having 300-mL in volume was charged with the H-type emulsion (210 g). To the autoclave, nitrogen (2 MPa) was introduced and the emulsion was dissolved at 165° C. for 5 minutes while stirring at 600 rpm. The internal pressure of the autoclave increased as the temperature increased. The maximum pressure was 2.7 MPa. After cooling, electrolyte solution AS5 taken out from the autoclave was cloudy. The scattering intensity ratio A/B of electrolyte solution AS5 in the dynamic light scattering particle-size measurement was 1000. After electrolyte solution AS5 was diluted with water so as to have a solid-content of 20 mass %, the transmittance of the solution at a wavelength of 800 nm (the UV measurement) was measured. The transmittance was 71% T. A laser scattering peak was observed with respect to electrolyte solution AS5. From the above, it is considered that the emulsion remained in AS5 and the polymer electrolyte was not dissolved.

The above results are summarized in the following Table 1.

TABLE 1

|  | Example 1 | Example 2 | Example 3 | Example 4 | Comparative Example 1 |
|---|---|---|---|---|---|
| Dissolution system | Continuous system | Continuous system | Continuous system | Continuous system | Batch system |
| Pressure (Mpa) | 9 | 9 | 9 | 6 | 2.7 |
| Dissolution temperature (° C.) | 290 | 290 | 290 | 290 | 165 |
| Retention time (minutes) | 7.5 | 15 | 45 | 7.5 | 7.5 |
| A | 1.8 | 0.9 | 0.6 | 2 | 1000 |
| B | 99.1 | 99.5 | 99.1 | 90.5 | 71 |
| C | Absent | Absent | Absent | Absent | Present |
| Clogging | ○ | ○ | ○ | Δ | ○ |
| Dissolved or not | ○ | ○ | ○ | ○ | X |
| Terminal CF2H amount (%; based on total number of terminals) | 51 | 57 | 65 | 45 | 30 |
| Fluorine ion concentration (ppm; based on the mass of fluorine-based polymer electrolyte) | 81 | 85 | 88 | 80 | 23 |

TABLE 1-continued

|  | Example 1 | Example 2 | Example 3 | Example 4 | Comparative Example 1 |
|---|---|---|---|---|---|
| Fe concentration (ppm; based on the mass of fluorine-based polymer electrolyte) | 0.21 | 0.40 | 0.62 | 0.18 | 10.5 |

* A: Scattering intensity ratio (—) in dynamic light scattering particle-size measurement B: Transmittance (% T) at wavelength of 800 nm in UV measurement C: Presence or absence of scattering peak in laser diffraction/scattering particle size distribution measurement Reference Example 1

Through the polymerization step, hydrolysis step and ultrafiltration step described in Example 1 of WO2011-034179A1, an emulsion (solid-content: 32.0 mass %, water: 68.0 mass %) containing a fluorine-based polymer electrolyte (equivalent mass=691 g/eq), which consisted of a copolymer (MFR=3.4 g/10 minutes) of olefin fluoride ($CF_2$=$CF_2$) and a vinyl fluoride compound ($CF_2$=CF—O—$(CF_2)_2$—$SO_3K$) and had an average particle diameter of 139 nm and an aspect ratio of 1.0, was obtained.

Subsequently, an autoclave made of SUS316 and having 300-mL in volume was charged with the resultant emulsion (131.3 g) and distilled water (78.8 g)(manufactured by Wako Pure Chemical Industries Ltd.) to prepare a raw material solution containing a fluorine-based polymer electrolyte (solid-content of 25 mass %) and water (75 mass %). To the autoclave, nitrogen was supplied so as to obtain 1.5 MPa (hereinafter, MPa refers to "gauge pressure"). The raw material solution was subjected to a dissolution operation at 290° C. for 60 minutes while stirring at 600 rpm. The internal pressure of the autoclave increased as the temperature increased. The maximum pressure was 6.9 MPa. After cooling, electrolyte solution AS6 taken out from the autoclave was homogeneous, colorless and transparent. The scattering intensity ratio A/B of electrolyte solution AS6 in the dynamic light scattering particle-size measurement was 1.2. The fluorine ion concentration of electrolyte solution AS6 was 123 ppm. No laser scattering peak was observed with respect to AS6. The terminal-$CF_2H$ amount and Fe concentration are as shown in Table 2.

Electrolyte solution AS6 was passed through a column packed with a cation exchange resin to exchange K ions of the fluorine-based polymer electrolyte with H ions to obtain electrolyte solution AS7. Electrolyte solution AS7 was poured onto a glass plate and applied (cast), placed in an oven and dried at 80° C. for 30 minutes and subsequently dried at 120° C. for 30 minutes to remove the solvent. A heat treatment was further applied at 160° C. for 20 minutes to obtain electrolyte membrane AM1 having a thickness of about 50 μm. When electrolyte membrane AM1 was subjected to a hot water dissolution resistance test, the mass loss ratio was 0.1 mass %.

An electrode catalyst layer was produced using electrolyte solution AS7 as follows. To a Pt carrying carbon particle (0.70 g) (trade name "TEC10E40E" carrying Pt 36.0 mass %, manufactured by Tanaka Kikinzoku Kogyo k.k.), which was a composite particle consisting of conductive carbon particles carrying a platinum (Pt) particle serving as a catalyst particle, AS7 (2.22 g) and ethanol (8.08 g) were added and these were sufficiently mixed by a homogenizer to obtain an electrode catalyst composition. The electrode catalyst composition was applied onto a PTFE sheet in accordance with a screen printing method. After coating, the electrode catalyst composition was dried in the air, at room temperature for one hour, and subsequently, dried at 160° C. for one hour. As described above, an electrode catalyst layer having a thickness of about 10 μm was produced on the PTFE sheet. Of the electrode catalyst layers obtained in this manner, an electrode catalyst layer carrying Pt in an amount of 0.15 mg/$cm^2$ was used as an anode catalyst layer (thickness: 5 μm) and an electrode catalyst layer carrying Pt in an amount of 0.30 mg/$cm^2$ was used as a cathode catalyst layer (thickness: 10 μm).

The anode catalyst layer was placed so as to face the cathode catalyst layer. Electrolyte membrane AM1 was inserted between them and subjected to hot press in the conditions of 180° C. and a surface pressure of 0.1 MPa. In this manner, the anode catalyst layer and the cathode catalyst layer were transferred to the electrolyte membrane and joined to produce MEA.

MEA was subjected to fuel cell evaluation as previously described. As a result, the current density after MEA was maintained at a cell temperature of 80° C. and a saturated vapor pressure at 80° C. (corresponding to a humidity of 100% RH) and a voltage of 0.7 V for 20 hours, was 0.44 A/$cm^2$.

Reference Example 2

Through the polymerization step, hydrolysis step and ultrafiltration step described in Example 1 of WO2011-034179A1, an Na-type emulsion (solid-content: 36.7 mass %, water: 63.3 mass %) containing a fluorine-based polymer electrolyte (equivalent mass=710 g/eq), which consisted of a copolymer (MFR=3.2 g/10 minutes) of olefin fluoride ($CF_2$=$CF_2$) and a vinyl fluoride compound ($CF_2$=CF—O—$(CF_2)_2$—$SO_3Na$) and had an average particle diameter of 111 nm and an aspect ratio of 1.0, was obtained.

Subsequently, an autoclave made of SUS316 and having 300-mL in volume was charged with the Na-type emulsion (114.4 g) and distilled water (95.6 g)(manufactured by Wako Pure Chemical Industries Ltd.) (fluorine-based polymer electrolyte having a solid-content of 20 mass % and water of 80 mass %). To the autoclave, nitrogen was supplied so as to obtain 1.5 MPa. A dissolution operation was performed at 250° C. for 120 minutes while stirring at 600 rpm. The internal pressure of the autoclave increased as the temperature increased. The maximum pressure was 3.6 MPa. After cooling, electrolyte solution AS8 taken out from the autoclave was homogeneous, colorless and transparent. The scattering intensity ratio A/B of electrolyte solution AS8 in the dynamic light scattering particle-size measurement was 1.2. The fluorine ion concentration of electrolyte solution AS8 was 101 ppm. No laser scattering peak was observed with respect to electrolyte solution AS8. The terminal-$CF_2H$ amount and Fe concentration are as shown in Table 2.

Electrolyte solution AS8 was passed through a column packed with a cation exchange resin to exchange Na ions of the fluorine-based polymer electrolyte with H ions to obtain electrolyte solution AS9. The same operation as in Reference Example 1 was repeated using electrolyte solution AS9 to obtain electrolyte membrane AM2 having a thickness of about 51 μm. When electrolyte membrane AM2 was subjected to a hot water dissolution resistance test, the mass loss ratio was 0.0 mass %.

The same operation as in Reference Example 1 was repeated using electrolyte solution AS9 to produce an anode catalyst layer and a cathode catalyst layer. MEA was produced by using the anode catalyst layer, the cathode catalyst layer and electrolyte membrane AM2.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.45 A/cm$^2$.

Reference Example 3

An autoclave made of SUS316 and having 300-mL in volume was charged with the same Na-type emulsion (114.4 g) as in Reference Example 2, distilled water (81.6 g) (manufactured by Wako Pure Chemical Industries Ltd.) and ethanol of 14.0 g (fluorine-based polymer electrolyte having a solid-content of 20 mass %, water of 73.3 mass % and ethanol 6.7 mass %). To the autoclave, nitrogen was supplied so as to obtain 4.0 MPa. A dissolution operation was performed at 220° C. for 240 minutes while stirring at 600 rpm. The internal pressure of the autoclave increased as the temperature increased. The maximum pressure was 7.9 MPa. After cooling, electrolyte solution AS9 taken out from the autoclave was homogeneous, colorless and transparent. The scattering intensity ratio A/B of electrolyte solution AS9 in the dynamic light scattering particle-size measurement was 1.1. The fluorine ion concentration of electrolyte solution AS9 was 89 ppm. No laser scattering peak was observed with respect to electrolyte solution AS9. The terminal-CF$_2$H amount and Fe concentration are as shown in Table 2.

Electrolyte solution AS9 was passed through a column packed with a cation exchange resin to exchange Na ions of the fluorine-based polymer electrolyte with H ions to obtain electrolyte solution AS10. The same operation as in Reference Example 1 was repeated using electrolyte solution AS10 to obtain electrolyte membrane AM3 having a thickness of about 51 μm. When electrolyte membrane AM3 was subjected to a hot water dissolution resistance test, the mass loss ratio was 0.1 mass %.

The same operation as in Reference Example 1 was repeated using electrolyte solution AS10 to produce an anode catalyst layer and a cathode catalyst layer. MEA was produced by using the anode catalyst layer, the cathode catalyst layer and electrolyte membrane AM3.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.45 A/cm$^2$.

Reference Example 4

An autoclave made of SUS316 and having 300-mL in volume was charged with the same Na-type emulsion (171.7 g) as in Reference Example 1 and distilled water (38.3 g) (manufactured by Wako Pure Chemical Industries Ltd.) (fluorine-based polymer electrolyte having a solid-content of 30 mass % and water of 70 mass %). To the autoclave, nitrogen was supplied so as to obtain 1.5 MPa. A dissolution operation was performed at 270° C. for 60 minutes while stirring at 600 rpm. The internal pressure of the autoclave increased as the temperature increased. The maximum pressure was 5.1 MPa. After cooling, electrolyte solution AS11 taken out from the autoclave was homogeneous, colorless and transparent. The scattering intensity ratio A/B of electrolyte solution AS11 in the dynamic light scattering particle-size measurement was 7.0×10$^{-1}$. The fluorine ion concentration of electrolyte solution AS11 was 100 ppm. No laser scattering peak was observed with respect to electrolyte solution AS11. The terminal-CF$_2$H amount and Fe concentration are as shown in Table 2.

Electrolyte solution AS11 was passed through a column packed with a cation exchange resin to exchange Na ions of the fluorine-based polymer electrolyte with H ions to obtain electrolyte solution AS12. The same operation as in Reference Example 1 was repeated using electrolyte solution AS12 to obtain electrolyte membrane AM4 having a thickness of about 51 When electrolyte membrane AM4 was subjected to a hot water dissolution resistance test, the mass loss ratio was 0.1 mass %.

The same operation as in Reference Example 1 was repeated using electrolyte solution AS12 to produce an anode catalyst layer and a cathode catalyst layer. MEA was produced by using the anode catalyst layer, the cathode catalyst layer and electrolyte membrane AM4.

MEA was subjected to fuel cell evaluation as previously described. As a result, current density after MEA was stored in the conditions of cell temperature: 80° C., saturated vapor pressure at 80° C. (corresponding to a humidity of 100% RH), and a voltage of 0.7 V, for 20 hours was 0.45 A/cm$^2$.

Example 5

The same Na-type emulsion as in Reference Example 2 having a solid-content of 36.7 mass % was diluted with distilled water manufactured by Wako Pure Chemical Industries Ltd. so as to obtain a solid-content in a polymer electrolyte of 35 mass % and stirred by a small stirrer to be homogeneous. The diluted emulsion was supplied by a supply pump to a tube made of SUS316 and having an inner diameter of 2.17 mm at a rate of 2.46 ml/min, allowed to pass through a tube having a length of 10 m passing through a thermostatic bath set at 270° C. and discharge from a back pressure regulating valve set at 7 MPa to obtain a homogeneous, colorless and transparent electrolyte solution AS13. The time of supplying the emulsion into a thermostatic bath set at 270° was 7.5 minutes. The scattering intensity ratio A/B of electrolyte solution AS13 in the dynamic light scattering particle-size measurement was 1.8. The fluorine ion concentration of electrolyte solution AS13 was 79 ppm. No laser scattering peak was observed with respect to electrolyte solution AS13. The terminal-CF$_2$H amount and Fe concentration are as shown in Table 2.

Electrolyte solution AS13 was passed through a column packed with a cation exchange resin to exchange Na ions of the fluorine-based polymer electrolyte with H ions to obtain electrolyte solution AS14. The same operation as in Reference Example 1 was repeated using electrolyte solution AS14 to obtain electrolyte membrane AM5 having a thickness of about 50 μm. When electrolyte membrane AM5 was subjected to a hot water dissolution resistance test, the mass loss ratio was 0.0 mass %.

The same operation as in Reference Example 1 was repeated using electrolyte solution AS14 to produce an anode catalyst layer and a cathode catalyst layer. MEA was produced by using the anode catalyst layer, the cathode catalyst layer and electrolyte membrane AM5.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.46 A/cm².

Comparative Example 2

As described in Japanese Patent Laid-Open No. 2010-225585, Comparative Example 1, a flake-like electrolyte (water: 12.1 mass %) of a fluorine-based polymer (equivalent mass=720 g/eq), which consisted of a copolymer (MFR=3.0 g/10 minutes) of olefin fluoride ($CF_2=CF_2$) and a vinyl fluoride compound ($CF_2=CF-O-(CF_2)_2-SO_3H$). The flake-like electrolyte had various shapes. It was difficult to precisely measure the sizes and aspect ratios under observation of an electron microscope; however the widths thereof generally fell within the range of 1 mm or more.

An autoclave made of Hastelloy C and having 300-mL in volume was charged with the flake-like electrolyte (71.7 g) and distilled water (138.3 g)(manufactured by Wako Pure Chemical Industries Ltd.) (fluorine-based polymer electrolyte having a solid-content of 30 mass % and water of 70 mass %). To the autoclave, nitrogen was supplied so as to obtain 1.5 MPa. A dissolution operation was performed at 240° C. for 120 minutes while stirring at 600 rpm. The internal pressure of the autoclave increased as the temperature increased. The maximum pressure was 3.2 MPa. After cooling, electrolyte solution AS15 taken out from the autoclave was homogeneous, light brown and transparent. The scattering intensity ratio A/B of electrolyte solution AS15 in the dynamic light scattering particle-size measurement was 1.0. The fluorine ion concentration of electrolyte solution AS15 was 706 ppm. No laser scattering peak was observed with respect to electrolyte solution AS15. The terminal-$CF_2H$ amount and Fe concentration were as shown in Table 2. The fluorine ion content and Fe amount were large.

Electrolyte solution AS15 was passed through a column packed with a Na ion exchange resin to exchange H ions of the fluorine-based polymer electrolyte with Na ions to obtain electrolyte solution AS16. The scattering intensity ratio A/B of electrolyte solution AS16 in the dynamic light scattering particle-size measurement was 2.1. The fluorine ion concentration of electrolyte solution AS16 was 705 ppm. No laser scattering peak was observed with respect to electrolyte solution AS16. The same operation as in Reference Example 1 was repeated using electrolyte solution AS16 to obtain electrolyte membrane AM6 having a thickness of about 52 µm. When electrolyte membrane AM6 was subjected to a hot water dissolution resistance test, the mass loss ratio was 3.4 mass %.

The same operation as in Reference Example 1 was repeated using electrolyte solution AS16 to produce an anode catalyst layer and a cathode catalyst layer. MEA was produced by using the anode catalyst layer, the cathode catalyst layer and electrolyte membrane AM6.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.04 A/cm².

In Comparative Example 2, when the flake-like electrolyte was dissolved at a high temperature, thermal decomposition took place and fluorine ion concentration increased. This phenomenon showed that the electrolyte membrane and electrode catalyst layer prepared from the electrolyte solution of Comparative Example 2 each are low in hot water dissolution resistance and significantly low in battery characteristic.

Comparative Example 3

The same operation as described in Comparative Example 1 of Japanese Patent Laid-Open No. 2010-225585 was repeated except that X of $-SO_3X$ of the fluorine-based polymer electrolyte was Na to obtain a flake-like electrolyte (water: 8.8 mass %) of a fluorine-based polymer (equivalent mass=720 g/eq), which consisted of a copolymer (MFR=3.0 g/10 minutes) of olefin fluoride ($CF_2=CF_2$) and a vinyl fluoride compound ($CF_2=CF-O-(CF_2)_2-SO_3Na$). The flake-like electrolyte had various shapes. It was difficult to precisely measure the sizes and aspect ratios under observation of an electron microscope; however the widths thereof generally fall within the range of 1 mm or more.

An autoclave made of SUS316 and having 300-mL in volume was charged with the flake-like electrolyte (46.1 g) and distilled water (164.0 g)(manufactured by Wako Pure Chemical Industries Ltd.) (fluorine-based polymer electrolyte having a solid-content of 20 mass % and water of 80 mass %). To the autoclave, nitrogen was supplied so as to obtain 1.5 MPa. A dissolution operation was performed at 290° C. for 240 minutes while stirring at 600 rpm. The internal pressure of the autoclave increased as the temperature increased. The maximum pressure was 6.9 MPa. After cooling, electrolyte solution AS17 taken out from the autoclave contained polymer electrolyte remaining unsolved and white turbidity. The scattering intensity ratio A/B of electrolyte solution AS17 in the dynamic light scattering particle-size measurement was $1.0 \times 10^2$. More specifically, electrolyte solution AS17 had peak A alone and no Peak B. The fluorine ion concentration of electrolyte solution AS17 was 145 ppm. Electrolyte solution AS17 had a laser scattering peak. The terminal-$CF_2H$ amount and Fe concentration are as shown in Table 2. The Fe amount was large.

Electrolyte solution AS17 was filtered by use of a membrane filter of 10 µm in diameter. The filtrate was subjected to the same operation as in Reference Example 1 to obtain electrolyte membrane AM7 having a thickness of about 51 µm. When electrolyte membrane AM7 was subjected to a hot water dissolution resistance test, the mass loss ratio was 1.9 mass %.

The same operation as in Reference Example 1 was repeated using electrolyte solution AS17 filtered to produce an anode catalyst layer and a cathode catalyst layer. MEA was produced by using the anode catalyst layer, the cathode catalyst layer and electrolyte membrane AM7.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.09 A/cm².

In Comparative Example 3, even if a salt electrolyte bulk was dissolved at a high temperature, a polymer electrolyte remained unsolved and dispersibility was low. It was also shown that the electrolyte membrane and electrode catalyst layer prepared from the electrolyte solution are low in hot water dissolution resistance and significantly low in battery characteristics.

Comparative Example 4

An autoclave made of SUS316 and having 300-mL in volume was charged with the same Na-type emulsion (114.4 g) as in Reference Example 2 and distilled water (95.6 g)(manufactured by Wako Pure Chemical Industries Ltd.) (fluorine-based polymer electrolyte having a solid-content of 20 mass % and water of 80 mass %). To the autoclave, nitrogen was supplied so as to obtain 1.5 MPa. A dissolution operation was performed at 360° C. for 60 minutes while stirring at 600 rpm. The internal pressure of the autoclave increased as the temperature increased. The maximum pressure was 15.0 MPa. After cooling, electrolyte solution AS18 taken out from the autoclave was slightly black and transparent. The scattering intensity ratio A/B of electrolyte solution AS18 in the dynamic light scattering particle-size measurement was $1.0 \times 10^{-3}$. The fluorine ion concentration of electrolyte solution AS18 was 1530 ppm. Electrolyte solution AS18 had a laser scattering peak. The terminal-$CF_2H$ amount and Fe concentration are as shown in Table 2. The fluorine ion content and Fe amount were large.

Electrolyte solution AS18 was filtered by use of a membrane filter of 10 μm in diameter. The filtrate was subjected to the same operation as in Reference Example 1 to obtain electrolyte membrane AM8 having a thickness of about 50 μm. When electrolyte membrane AM8 was subjected to an hot water dissolution resistance test, the mass loss ratio was 14.0 mass %.

The same operation as in Reference Example 1 was repeated using electrolyte solution AS18 filtered to produce an anode catalyst layer and a cathode catalyst layer. MEA was produced by using the anode catalyst layer, the cathode catalyst layer and electrolyte membrane AM8.

MEA was subjected to fuel cell evaluation as previously described. As a result, current density after MEA was maintained at a cell temperature of 80° C. and a saturated vapor pressure at 80° C. (corresponding to a humidity of 100% RH) and a voltage of 0.7 V for 20 hours, was 0.01 $A/cm^2$.

In Comparative Example 4, when a salt-type electrolyte was dissolved at an extremely high temperature, thermal decomposition took place and fluorine ion concentration increased and the molecular mass decreased. Because of this, the scattering intensity ratio A/B in the dynamic light scattering particle-size measurement became less than $1.0 \times 10^{-2}$. As a result, it was shown that the hot water dissolution resistance of the electrolyte membrane and electrode catalyst layer prepared from electrolyte solution AS18 decreased and battery characteristic significantly decreased.

TABLE 2

| | | Reference Example 1 | Reference Example 2 | Reference Example 3 | Reference Example 4 | Example 5 | Comparative Example 2 | Comparative Example 3 | Comparative Example 4 |
|---|---|---|---|---|---|---|---|---|---|
| Polymer electrolyte | MFR(g/10 min) | 3.4 | 3.2 | 3.2 | 3.2 | 3.2 | 3.0 | 3.0 | 3.2 |
| | Average particle diameter (nm) | 139 | 111 | 111 | 111 | 111 | — | — | 111 |
| | Aspect ratio | 1.0 | 1.0 | 1.0 | 1.0 | 1.0 | — | — | 1.0 |
| | Equivalent mass (g/eq) | 691 | 710 | 710 | 710 | 710 | 720 | 720 | 710 |
| | Solid-content concentration (%) | 32 | 36.7 | 36.7 | 36.7 | 35 | — | — | 36.7 |
| | Shape | Emulsion | Emulsion | Emulsion | Emulsion | Emulsion | Flake-like polymer | Flake-like polymer | Emulsion |
| | —$SO_3X$ | K | Na | Na | Na | Na | H | Na | Na |
| Water-containing solvent | Water/ethanol (mass % ratio) | 100/0 | 100/0 | 91.7/8.3 | 100/0 | 100/0 | 100/0 | 100/0 | 100/0 |
| Dissolution treatment condition | Fluorine based polymer electrolyte solid-content concentration (mass %) | 25 | 20 | 20 | 30 | 35 | 30 | 20 | 20 |
| | Temperature (° C.) | 290 | 250 | 220 | 270 | 270 | 240 | 290 | 360 |
| | Time (minutes) | 60 | 120 | 240 | 60 | 7.5 | 120 | 240 | 60 |
| | Dissolution system | Batch system | Batch system | Batch system | Batch system | Continuous system | Batch system | Batch system | Batch system |
| Electrolyte solution | Scattering intensity ratio A/B | 1.2 | 1.2 | 1.1 | 0.7 | 1.8 | 1.0 | 100 | $1.0 \times 10^{-3}$ |
| | Fluorine ion concentration (ppm; based on the mass of fluorine-based polymer electrolyte) | 123 | 101 | 89 | 100 | 79 | 706 | 145 | 1530 |
| | Presence or absence of laser scattering peak | Absent | Absent | Absent | Absent | Absent | Absent | Present | Present |
| | Terminal-$CF_2H$ amount (%; based on total number of terminals) | 74 | 44 | 41 | 66 | 48 | 42 | 91 | 100 |
| | Fe concentration (ppm; based on the mass of fluorine-based polymer electrolyte) | 7.7 | 5.2 | 3.0 | 4.3 | 0.12 | 42 | 15 | 29 |
| Evaluation after dissolution treatment | Polymer electrolyte remaining undissolved | Absent | Absent | Absent | Absent | Absent | Absent | Present | Present |
| | Mass loss ratio in hot water dissolution resistance test (mass %) | 0.1 | 0.0 | 0.1 | 0.1 | 0.0 | 3.4 | 1.9 | 14.0 |
| Fuel cell evaluation | Current density ($A/cm^3$) | 0.44 | 0.45 | 0.45 | 0.45 | 0.46 | 0.04 | 0.09 | 0.01 |

The present application is made based on Japanese Patent Application No. 2013-139139 filed Jul. 2, 2013 with the Japan Patent Office and Japanese Patent Application No. 2014-058612 filed Mar. 20, 2014 with the Japan Patent Office, the contents of which are incorporated herein by reference.

INDUSTRIAL APPLICABILITY

The electrolyte solution obtained by the production method or continuously dissolving facility of the present invention has industrial applicability as a material for an electrolyte membrane, a catalyst layer, an electrode catalyst layer, a membrane electrode assembly and a fuel cell.

The invention claimed is:

1. A method for producing an electrolyte solution, comprising:
   continuously supplying a polymer emulsion that is itself produced by emulsion polymerization and comprising a polymer electrolyte and a solvent into a dissolution facility;
   continuously dissolving the polymer electrolyte in the solvent by heating an interior of the dissolution facility to obtain the electrolyte solution, wherein the solvent contains 80 to 100 mass % of water and 0 to 20 mass % of an alcohol; and
   continuously discharging the electrolyte solution out of the dissolution facility through a back pressure regulating valve while maintaining a pressurized condition within the dissolution facility;
   wherein a heating temperature of the interior of the dissolution facility is from 50° C. to 500° C.; and
   wherein the polymer electrolyte contains a fluorine-based polymer electrolyte.

2. The method for producing the electrolyte solution according to claim 1, wherein a heating temperature of the interior of the dissolution facility is from 150° C. to 350° C.

3. The method for producing the electrolyte solution according to claim 1, wherein, in the continuously dissolving, a heating temperature of the interior of the dissolution facility is from 150° C. to 290° C.

4. The method for producing the electrolyte solution according to claim 1, wherein, in the continuously dissolving, a pressure within the dissolution facility exceeds vapor pressure of the solvent at the heating temperature of the dissolution facility.

5. The method for producing the electrolyte solution according to claim 1, further comprising, after the continuously dissolving, cooling the electrolyte solution while maintaining a pressure exceeding the vapor pressure of the solvent at the heating temperature of the interior of the dissolution facility.

6. The method for producing the electrolyte solution according to claim 1, wherein the dissolution facility is a tube.

7. The method for producing the electrolyte solution according to claim 1, wherein
   the fluorine-based polymer electrolyte has an average particle diameter of 10 nm or more and less than 500 nm, and
   the fluorine-based polymer electrolyte contains a —$SO_3X$ group where X is an alkali metal, an alkaline-earth metal or $NR_1R_2R_3R_4$ where $R_1,R_2,R_3$ and $R_4$ are each independently an alkyl group having 1 to 3 carbon atoms or hydrogen.

* * * * *